US010753722B1

(12) United States Patent
Merewether

(10) Patent No.: US 10,753,722 B1
(45) Date of Patent: Aug. 25, 2020

(54) SYSTEMS AND METHODS FOR LOCATING BURIED OR HIDDEN OBJECTS USING SHEET CURRENT FLOW MODELS

(71) Applicant: Ray Merewether, La Jolla, CA (US)

(72) Inventor: Ray Merewether, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 15/457,222

(22) Filed: Mar. 13, 2017

Related U.S. Application Data

(63) Continuation of application No. 13/605,960, filed on Sep. 6, 2012, now Pat. No. 9,599,449.

(60) Provisional application No. 61/531,598, filed on Sep. 6, 2011.

(51) Int. Cl.
| | |
|---|---|
| *G06F 15/00* | (2006.01) |
| *G01B 7/26* | (2006.01) |
| *G01V 3/08* | (2006.01) |
| *G01V 3/15* | (2006.01) |

(52) U.S. Cl.
CPC ............... *G01B 7/26* (2013.01); *G01V 3/08* (2013.01); *G01V 3/15* (2013.01)

(58) Field of Classification Search
None
See application file for complete search history.

(56) References Cited

U.S. PATENT DOCUMENTS

| | | | |
|---|---|---|---|
| 2002/0130806 A1* | 9/2002 | Taylor, Jr. ............... | G01S 13/89 342/22 |
| 2006/0232259 A1* | 10/2006 | Olsson ............... | G01R 29/0871 324/67 |

FOREIGN PATENT DOCUMENTS

WO    01/084188    11/2001

OTHER PUBLICATIONS

International Searching Authority, "Written Opinion of the international Searching Authority" for PCT Patent Application No. PCT/US12/054024, dated Mar. 6, 2014, European Patent Office, Munich.

* cited by examiner

*Primary Examiner* — Aditya S Bhat
(74) *Attorney, Agent, or Firm* — Steven C. Tietsworth, Esq.

(57) ABSTRACT

Systems, methods, and apparatus for determining an estimated depth of a buried object using sheet current flow models are disclosed. In one embodiment a buried object locator includes a processor to process magnetic signals emitted from the buried object using a closed form sheet current flow model taken from multiple spaced-apart positions to determine, store, and/or display estimated depth information of the buried object.

16 Claims, 16 Drawing Sheets

Example Buried Object Measurement with Three Sensor Buried Object Locator

Example Buried Object Measurement with Three Sensor Buried Object Locator

*Example Ground Profile*

Example Current Signaling in Buried Object

Sheet Current Return Current Flow Model $D_b$ = Depth of Conductor Below Ground Surface
$H$ = Distance of Bottom Sensor Measurement Above Ground Surface Example Buried Object Measurement with Three Sensor Positions Example Buried Object Measurement with Three Sensor Buried Object Locator Example Buried Object Measurement Using Measurements at Three Sensor Positions to Determine Estimated Values at Three Virtual Positions Example Buried Object Measurement Using Three Rotated Sensor Positions Example Locator Configuration Example Automated Buried Object Detection Procedure Using Three or Four Sensor Measurements and Automatic Distance Detection Example Buried Object Measurement with Distance Sensor Example Process for Generating Buried Object Depth Information From Multiple
Magnetic Field Samples and Distance Information Example Buried Object Measurement with Two Sensor Buried Object Locator Example Process for Generating Buried Object Depth Information Using Two Sensor
Locator with Paired Measurements Taken at Two Positions

SYSTEMS AND METHODS FOR LOCATING BURIED OR HIDDEN OBJECTS USING SHEET CURRENT FLOW MODELS

CROSS-REFERENCE TO RELATED APPLICATIONS

This application is a continuation of and claims priority to co-pending U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS, which claims priority under 35 U.S.C. § 119(e) to U.S. Provisional Patent Application Ser. No. 61/531,598, filed Sep. 6, 2011, entitled SYSTEMS & METHODS FOR LOCATING BURIED OR HIDDEN OBJECTS USING SHEET CURRENT FLOW MODELS, the contents of which are hereby incorporated by reference herein in their entirety for all purposes.

FIELD

The present disclosure relates generally to systems and methods for locating buried or hidden objects. More particularly, but not exclusively, the disclosure relates to systems, methods, and apparatus for locating buried objects using magnetic fields emitted from the object and determining and displaying an estimate of the distance/depth of the object based on three or more magnetic field measurements taken at different positions relative to the buried object. The three or more magnetic field measurements may be processed in accordance with a sheet current flow model to determine the distance/depth estimate.

BACKGROUND

There are many situations where is it desirable to locate buried utilities such as pipes and cables. For example, before starting any new construction that involves excavation, worker safety and project economic concerns require the location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects."

As used herein, the term "buried objects" also includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business. Accordingly, the art is replete with proposed solutions to the buried object locating problem, including a number of patents and patent applications owned by SeekTech, Inc., assignee of the instant application.

A sonde typically includes a coil of wire wrapped around a ferromagnetic core that is packaged for insertion into a buried nonconductive conduit, such as a plastic utility runway or a concrete water pipe to generate electromagnetic energy. Still other buried objects, such as conductive lines and pipes, may be located by first applying an external signal to the object to induce a current flow therein, thereby generating a magnetic field that may be detected by a magnetic sensor. In some applications, currents may be induced into the buried object by existing magnetic fields, such as those sent from commercial or military radio transmitters or other transmitting devices.

In an exemplary buried object locating system, an external electrical signal source (also known as a buried object transmitter or just "transmitter" for brevity) having a frequency in the range of approximately 4 Hz to 500 kHz has a well-known utility for energizing conductive objects by direct electrical coupling to permit their location through sensing of emitted magnetic fields. Other buried objects, such as underground power transmission lines, inherently carry current which generates surrounding magnetic fields. These examples of active and passive locating of buried conductors are also commonly described as "line tracing."

SUMMARY

This disclosure is directed generally to locators for use in detecting buried or hidden objects. More particularly, but not exclusively, the disclosure relates to systems, methods, and apparatus for locating buried objects using magnetic fields surrounding the object and determining the depth of the object based on three or more magnetic field measurements taken at different positions relative to the buried object using processing based on a sheet current flow model. The magnetic field measurements may be taken by moving a single magnetic field sensor to multiple positions for taking measurements, and/or by taking measurements from multiple magnetic field sensors offset a known relative distance from each other.

For example, in one aspect, the disclosure relates to a method for locating a buried object with a buried object locator. The method may include, for example, generating, in the locator, a first magnetic field measurement at a first position, generating, in the locator, a second magnetic field measurement at a second position different from the first position, generating, in the locator, a third magnetic field measurement at a third position different from the first and second positions, and storing the first, second, and third magnetic field measurements and associated position information in a memory of the locator. The method may further include processing, in a processing element of the locator or other electronic computing system, the first, second, and third magnetic field measurements and associated position information. The measurements and position information may be processed in accordance with a closed-form sheet current flow model to generate an estimate of the depth, $D_b$, of the buried object below a ground surface. The method may further include storing the estimated depth in the memory. The method may further include providing a visual display of the estimated depth on a display of the locator or other device. The method may further include sending the estimated depth to an external electronic computing system via a wired or wireless connection.

In another aspect, the disclosure relates to a locator for determining the location of a buried object. The locator may include, for example, a magnetic field sensor assembly. The magnetic field sensor assembly may include one or more magnetic field sensors configured to generate first, second, and third magnetic field measurement information at corresponding first, second, and third positions, one or more memory modules, and one or more processing modules coupled to the memory. The processing modules may include one or more processing elements configured to receive the first, second, and third magnetic field measurement information, process the received first, second, and third magnetic field measurement information in accordance with a closed-form sheet current flow model to generate an estimated distance to the buried object, store the estimated depth in the memory, and provide a visual display of the estimated depth on the locator.

In another aspect, the disclosure relates to a non-transitory machine-readable medium containing processor-executable instructions for causing a computer to receive first, second, and third magnetic field measurement information, and process the received first, second, and third magnetic field measurement information in accordance with a sheet current flow model to generate an estimated depth of a buried object below a ground surface.

In another aspect, the disclosure relates to a method for locating a buried object with a buried object locator. The method may include, for example, generating, in the locator, a lower magnetic field measurement at a first locator position, generating, in the locator, an upper magnetic field measurement at the first locator position, generating, in the locator, a lower magnetic field measurement at a second locator position different from the first position, generating, in the locator, an upper magnetic field measurement at the second locator position, storing the first and second locator position lower and upper magnetic field measurements in a memory of the locator, processing the first and second position lower and upper magnetic field measurements in accordance with a closed-form sheet current flow model to generate an estimate of the depth, $D_b$, of the buried object below a ground surface, and storing the estimated depth in the memory. The estimate of the buried object depth, $D_b$, may be determined using a closed-form sheet current flow model.

In another aspect, the disclosure relates to a locator for determining the location of a buried object. The locator may include, for example, a magnetic field sensor assembly. The magnetic field sensor assembly may include a plurality of magnetic field sensors configured to generate lower and upper magnetic field measurement information at first and second locator positions, a memory module, and a processor module coupled to the memory, wherein the processor is configured to process the first and second position lower and upper magnetic field measurements in accordance with a closed-form sheet current flow model to generate an estimate of the depth, $D_b$, of the buried object below a ground surface, store the estimated depth in the memory, and provide a visual display of the estimated depth on the locator. The estimated depth, $D_b$, may be determined in the processor module using a closed-form sheet current flow model.

In another aspect, the disclosure relates to a non-transitory machine-readable medium containing processor-executable instructions for causing a computer to receive a lower magnetic field measurement at a first locator position, an upper magnetic field measurement at the first locator position, a lower magnetic field measurement at a second locator position different from the first position, and an upper magnetic field measurement at the second locator position, store the first and second locator position lower and upper magnetic field measurements in a memory, and process the first and second position lower and upper magnetic field measurements in accordance with a closed-form sheet current flow model to generate an estimate of the depth of a buried object below a ground surface.

In another aspect, the disclosure relates to apparatus and systems for performing the above-described methods, in whole or in part.

In another aspect, the disclosure relates to computer-readable media including instructions for causing a processor module or computer to perform the above-described methods, in whole or in part.

In another aspect, the disclosure relates to means for performing the above-described methods, in whole or in part.

Various additional aspects, details, and functions are further described below in conjunction with the appended drawing figures.

BRIEF DESCRIPTION OF THE DRAWINGS

For a more complete understanding of this disclosure, reference is now made to the following detailed description of the embodiments as illustrated in the accompanying drawings, in which like reference designations represent like features throughout the several views and wherein.

DETAILED DESCRIPTION

Figure 1:
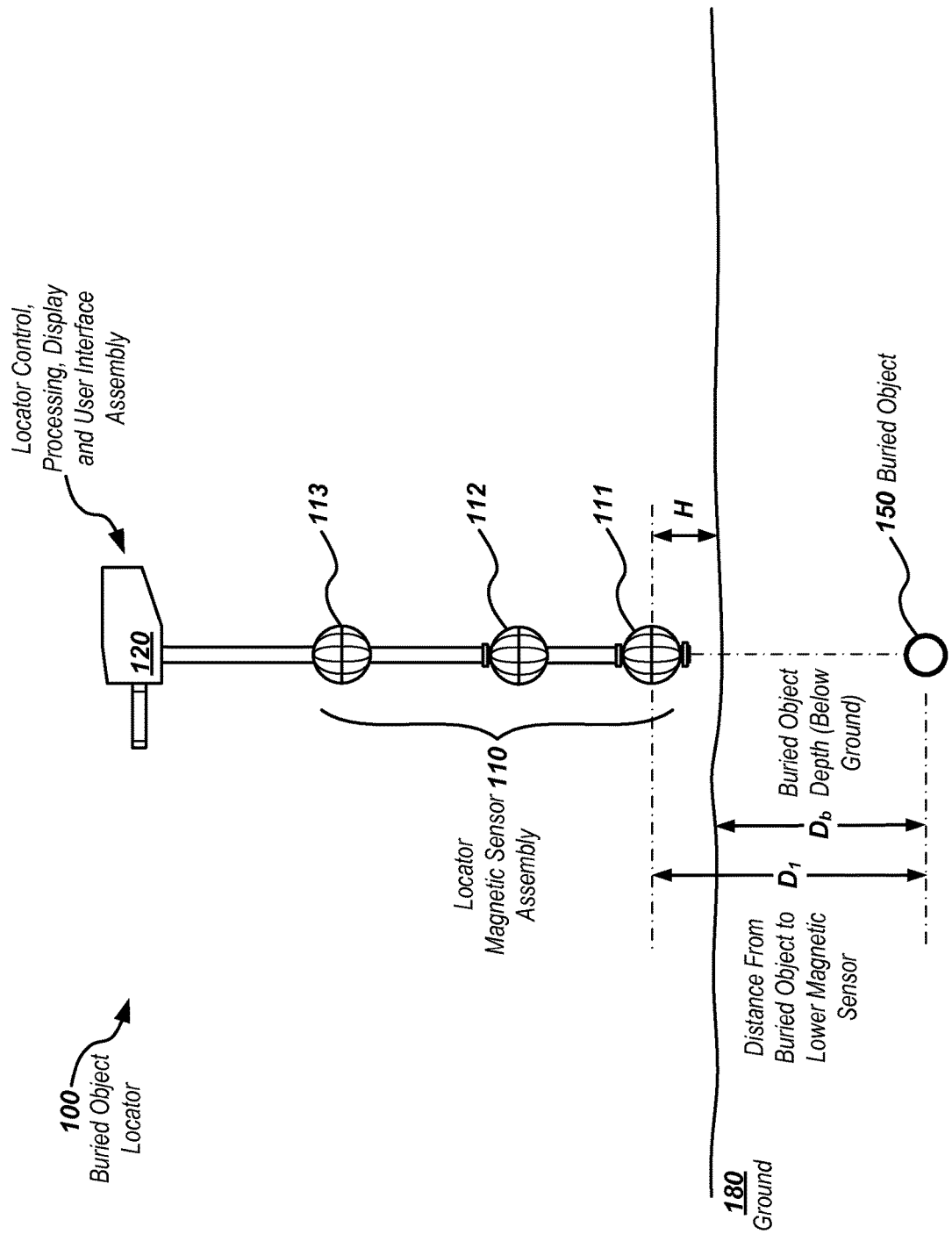
FIG. 1 illustrates details of an example buried object location operation ("line tracing")

In various embodiments, the teachings described herein may be implemented in buried object locator devices and systems, such as in conjunction with those described in the following co-assigned patents and patent applications: U.S. Pat. No. 7,336,078, entitled MULTI-SENSOR MAPPING OMNIDIRECTIONAL SONDE AND LINE LOCATORS, issued Feb. 26, 2008; U.S. Pat. No. 7,332,901, entitled LOCATOR WITH APPARENT DEPTH INDICATION, issued Feb. 19, 2008; U.S. Pat. No. 7,276,910, entitled COMPACT SELF-TUNED ELECTRICAL RESONATOR FOR BURIED OBJECT LOCATOR APPLICATIONS, issued Oct. 2, 2007; U.S. Pat. No. 7,136,765, entitled BURIED OBJECT LOCATING AND TRACING METHOD AND SYSTEM EMPLOYING PRINCIPAL COMPONENTS ANALYSIS FOR BLIND SIGNAL DETECTION, issued Nov. 14, 2006; U.S. Pat. No. 7,009,399, entitled OMNIDIRECTIONAL SONDE AND LINE LOCATOR, issued Mar. 7, 2006; U.S. patent application Ser. No. 11/054,776, entitled BURIED OBJECT LOCATING AND TRACING METHOD AND SYSTEM EMPLOYING PRINCIPAL COMPONENTS ANALYSIS FOR BLIND SIGNAL DETECTION, filed on Feb. 9, 2005; U.S. Patent Application Ser. No. 61/614,829, entitled QUAD-GRADIENT COILS FOR USE IN LOCATING SYSTEMS, filed on Mar. 23, 2012; and U.S. patent application Ser. No. 11/774,462, entitled SYSTEM AND METHODS FOR LOCATING BURIED PIPES AND CABLES WITH A MAN PORTABLE LOCATOR AND A TRANSMITTER IN A MESH NETWORK, filed Jul. 6, 2007, scheduled to be issued as U.S. Pat. No. 8,264,226 on Sep. 11, 2012. The content of each of these applications is incorporated by reference herein in its entirety. These applications may be collectively referred to herein as the "incorporated applications."

The present disclosure relates generally to systems and methods for locating buried or hidden objects. More particularly, but not exclusively, the disclosure relates to systems, methods, and apparatus for locating buried objects using magnetic fields emitted from the object and determining and displaying an estimate of the distance/depth of the object based on three or more magnetic field measurements taken at different positions relative to the buried object. The three or more magnetic field measurements may be processed in accordance with a sheet current flow model to determine the distance/depth estimate. The magnetic field measurements may be taken by moving a single magnetic field sensor to multiple positions for taking measurements, and/or by taking measurements from multiple magnetic field sensors offset a known relative distance from each other. The multiple sensors/antennas offset a known relative distance may be moved as a group to acquire magnetic field data at multiple points or along a multiplicity of paths through space above the ground.

For example, in one aspect, the disclosure relates to a method for determining the depth of a buried object by taking three or more magnetic field measurements, either by using a single magnetic field antenna/sensor located at three positions relative to the buried object, or by taking measurements from two or more magnetic field sensors offset at a known relative position to each other.

In an exemplary embodiment, a locator may include three magnetic field antennas co-linearly located at known relative distances from each other. The three antennas may be vertically "stacked" relative to each other during a locate operation to measure magnetic field components, including at least a horizontal magnetic field component at each antenna, which may then be used to provide a closed-form estimate of distance/depth to the buried object. In addition, a locator may include two or more horizontally offset magnetic field antennas for locating a centerline or tangent line, from the ground, relative to the buried object, such as by equalizing magnetic field measurements in each antenna/sensor to estimate the centerline. Outputs from the horizontal and vertical magnetic field sensors may be used to automatically determine an optimal position above the buried object and the multiple measurements may be collected and processed, such as further described below, to generate an estimate of the distance to the buried object below the ground.

In another aspect, the disclosure relates to a method for locating a buried object with a buried object locator. The method may include, for example, generating a first magnetic field measurement at a first position, generating a second magnetic field measurement at a second position different from the first position, generating a third magnetic field measurement at a third position, which may be different from the first and second positions, and processing the first, second, and third magnetic field measurements in accordance with a sheet current flow model to generate an estimated distance/depth to the buried object.

The first, second, and third positions may, for example, be co-linear on a line. The line may be oriented along a vertical centerline extending upward from the buried object and ground surface. The vertical centerline may be a tangent line from the buried object and extending upward from the ground surface. Alternately, the line may be offset at an angle from the vertical centerline. Alternately, or in addition, the first, second, and third positions may be co-linear on a line translated horizontally from the vertical centerline.

The measurements at the first, second, and third positions may, for example, be generated by corresponding first, second, and third antenna sensors. The measurements at the first, second, and third positions may be generated simultaneously or may be generated at different times. Alternately, the measurements at the first, second, and third positions may be generated by one or two antenna sensors.

The sheet current flow model may include, for example, a magnetic field component modeled as being generated by an infinite sheet current. In addition, the sheet current flow model may include an additional magnetic field component modeled as being generated by a current flowing in a buried conductor. Alternately, the sheet current flow model may include an additional magnetic field component modeled as being generated by a magnetic dipole antenna disposed within the buried object. Alternately, the sheet current flow model may include a magnetic field component modeled as being generated by a finite sheet current. The finite sheet current may be modeled as being non-uniform.

The first and second positions may, for example, be at a first distance relative to each other, and the second and third positions may at a second distance relative to each other, and the first distance may be different than the second distance.

The sheet current flow model may include, for example, a model of a sheet current flowing in a ground material in proximity to a ground surface and a model of a conductor current flowing in a conductor disposed at a distance below the ground surface. The sheet current and the conductor current may flow in substantially opposite directions. The sheet current flow model may represent an infinite current sheet and corresponding magnetic field. The sheet current flow model may represent a finite current sheet and corresponding magnetic field. The sheet current flow model may be represented by a closed-form equation solution.

Alternately, the sheet current flow model may be represented by an open-form equation solution, and the method may further include solving the open-form equation. The open-form equation may be iteratively solved to determine the distance/depth estimate. The open-form equation may be numerically solved.

The method may further include, for example, automatically determining an optimal measurement position above the ground to the buried object. The method may further include generating and processing the magnetic field measurements responsive to the automatically determined optimal measurement position. The automatic determination of an optimal measurement position above the ground may include determining a vertical centerline through the buried object. The vertical centerline may be determined by using one or more horizontally oriented magnetic field sensors.

In another aspect, the disclosure relates to a locator for determining the location of a buried object. The locator may include, for example, a magnetic field sensor assembly. The magnetic field sensor assembly may include one or more magnetic field sensors configured to generate first, second, and third magnetic field measurement information at corresponding first, second, and third positions, a memory module, and a processor module coupled to the memory. The processor module may be configured to receive the first, second, and third magnetic field measurement information, and process the received first, second, and third magnetic field measurement information in accordance with a sheet current flow model to generate an estimated distance to the buried object.

The magnetic field sensor assembly may include, for example, a first magnetic field sensor module configured to generate the first magnetic field measurement information, a second magnetic field sensor module configured to generate the second magnetic field measurement information, and a third magnetic field sensor module configured to generate the third magnetic field measurement information. Alternately, or in addition, the magnetic field sensor assembly may include a location determination module, and a magnetic field sensor module configured to generate the first magnetic field measurement information, the second magnetic field measurement information, and the third magnetic field measurement information based at least in part on information provided from the location determination module.

In another aspect, the disclosure relates to a non-transitory machine-readable medium containing processor-executable instructions. The processor-executable instructions may cause a processor element or computer to receive first, second, and third magnetic field measurement information, and process the received first, second, and third magnetic field measurement information in accordance with a sheet current flow model to generate an estimated distance to a buried object.

In another aspect, the disclosure relates to a locator for determining the location of a buried object. The locator may include, for example, means for generating first magnetic field measurement information, means for generating second magnetic field measurement information, means for generating third magnetic field measurement information, means for receiving the first, second, and third magnetic field measurement information, and means for processing the received first, second, and third magnetic field measurement information in accordance with a sheet current flow model to generate an estimated distance to the buried object.

In another aspect, the disclosure relates to a method for locating a buried object with a buried object locator. The method may include, for example, generating, in the locator, a first magnetic field measurement at a first position, generating, in the locator, a second magnetic field measurement at a second position different from the first position, generating, in the locator, a third magnetic field measurement at a third position different from the first and second positions, and storing the first, second, and third magnetic field measurements and associated position information in a memory of the locator. The method may further include processing, in a processing element of the locator or other electronic computing system, the first, second, and third magnetic field measurements and associated position information. The measurements and position information may be processed in accordance with a closed-form sheet current flow model to generate an estimate of the depth, Db, of the buried object below a ground surface. The method may further include storing the estimated depth in the memory. The method may further include providing a visual display of the estimated depth on a display of the locator or other device. The method may further include sending the estimated depth to an external electronic computing system via a wired or wireless connection.

The first, second, and third positions may be, for example, substantially co-linear on a line intersecting the buried object. The line may be along a vertical centerline extending upward from the buried object and ground surface. The line may be offset at an angle of approximately ten degrees or less from a vertical centerline extending upward from the buried object and ground surface. The first, second, and third positions may alternately be co-linear on a line translated horizontally from a vertical centerline extending upward from the buried object and ground surface.

The measurements at the first, second, and third positions may, for example, be generated by corresponding first, second, and third magnetic field antenna sensors. The measurements at the first, second, and third positions may be generated substantially simultaneously by the first, second, and third magnetic field antenna sensors. Alternately, the measurements at the first, second, and third positions may be generated sequentially by a single magnetic field antenna sensor moved between the first, second, and third positions. Alternately, the measurements at the first, second, and third positions may be generated by two magnetic field antenna sensors moved between two or more of the positions.

The sheet current flow model may include, for example, a magnetic field component modeled as being generated by an infinite sheet current and another magnetic field component modeled as being generated by a current flowing in a buried conductor. The estimate of the buried object depth, $D_b$, may be determined using a closed-form sheet current flow model. The sheet current flow model may include a magnetic field component modeled as being generated by a finite sheet current. The first and second positions may be at a first distance relative to each other and the second and third positions may be at a second distance relative to each other. The first distance may be different than the second distance or, in some embodiments, may be the same distance. The sheet current flow model may include a model of a sheet current flowing in a ground material in proximity to a ground surface and a model of a conductor current flowing in a conductor disposed at a distance below the ground surface.

The sheet current flow model may, for example, be represented by an open-form equation solution rather than a closed-form solution. The method may further include solving the open-form equation. The open-form equation may be iteratively solved in the locator or other electronic computing system.

The method may further include, for example, automatically determining an optimal measurement position above the ground to the buried object, and generating and processing the magnetic field measurements responsive to the automatically determined optimal measurement position. Automatically determining an optimal measurement position above the ground may include determining a centerline using one or more horizontally oriented magnetic field sensors to provide information to position the locator over the buried object.

The method may further include, for example, storing a specification of a buried object depth in the locator, comparing the estimated depth to the specification depth, and providing, responsive to the comparison, a notification. The notification may include providing an operator alarm, display, audio, or visual indication if the estimated depth is less than the specification and/or storing information associated with the estimated depth, specification, and/or out of specification distance of the estimated depth. The notification may include storing a database entry indicative of the difference between the estimated depth and the specification.

In another aspect, the disclosure relates to a locator for determining the location of a buried object. The locator may include, for example, a magnetic field sensor assembly. The magnetic field sensor assembly may include one or more magnetic field sensors configured to generate first, second, and third magnetic field measurement information at corresponding first, second, and third positions, one or more memory modules, and one or more processing modules coupled to the memory. The processing modules may include one or more processing elements configured to receive the first, second, and third magnetic field measurement information, process the received first, second, and third magnetic field measurement information in accordance with a closed-form sheet current flow model to generate an estimated distance to the buried object, store the estimated depth in the memory, and provide a visual display of the estimated depth on the locator.

The magnetic field sensor assembly may include, for example, a first magnetic field sensor module configured to generate the first magnetic field measurement information, a second magnetic field sensor module configured to generate the second magnetic field measurement information, and a third magnetic field sensor module configured to generate the third magnetic field measurement information. The magnetic field sensor assembly may include a location determination module, and a magnetic field sensor module configured to generate the first magnetic field measurement information, the second magnetic field measurement information, and the third magnetic field measurement information based at least in part on information provided from the location determination module. The estimated depth, $D_b$, may be determined in the processor module using a closed-form sheet current flow model.

In another aspect, the disclosure relates to a non-transitory machine-readable medium containing processor-executable instructions for causing a computer to receive first, second, and third magnetic field measurement information, and process the received first, second, and third magnetic field measurement information in accordance with a sheet current flow model to generate an estimated depth of a buried object below a ground surface.

In another aspect, the disclosure relates to a method for locating a buried object with a buried object locator. The method may include, for example, generating, in the locator, a lower magnetic field measurement at a first locator position, generating, in the locator, an upper magnetic field measurement at the first locator position, generating, in the locator, a lower magnetic field measurement at a second locator position different from the first position, generating, in the locator, an upper magnetic field measurement at the second locator position, storing the first and second locator position lower and upper magnetic field measurements in a memory of the locator, processing the first and second position lower and upper magnetic field measurements in accordance with a closed-form sheet current flow model to generate an estimate of the depth, $D_b$, of the buried object below a ground surface, and storing the estimated depth in the memory. The estimate of the buried object depth, $D_b$, may be determined using a closed-form sheet current flow model.

In another aspect, the disclosure relates to a locator for determining the location of a buried object. The locator may include, for example, a magnetic field sensor assembly. The magnetic field sensor assembly may include a plurality of magnetic field sensors configured to generate lower and upper magnetic field measurement information at first and a second locator positions, a memory module, and a processor module coupled to the memory, wherein the processor is configured to process the first and second position lower and upper magnetic field measurements in accordance with a closed-form sheet current flow model to generate an estimate of the depth, $D_b$, of the buried object below a ground surface, store the estimated depth in the memory, and provide a visual display of the estimated depth on the locator. The estimated depth, $D_b$, may be determined in the processor module using a closed-form sheet current flow model.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Before describing various aspects further, an overview of the buried object locator ("tracing") problem, along with various constraints and variables, is described below.

Turning to FIG. 1, an example locator 100, which may include a magnetic sensor assembly 110 and a control unit 120, is shown positioned vertically above the ground 180. The magnetic sensor assembly 110 may include one or more magnetic field antennas/sensors, such as antennas 111, 112, and 113 as shown, which may be single axis or multi-axis (e.g., three axis) magnetic field sensors. Two or three axis magnetic sensors may be omnidirectional nested sensor arrays for measuring orthogonal magnetic field components in two or three directions.

Control unit 120 may include elements such as a user interface, one or more displays or other visual or audio outputs, one or more control inputs, as well as electronics for processing signals received from the sensors of the sensor assembly and memory for storing generated information.

The electronics may include analog or digital electronic circuits for signal condition, analog-to-digital conversion, as well as processor elements and associated memory for storing data and instructions for processing the received sensor signals. Other elements, such as inertial navigation elements, GPS or other position sensing elements, additional magnetic field sensors (e.g., horizontally oriented magnetic field sensors for determining a centerline of the buried object), accelerometers, compass sensors, magnetometers, as well as other elements, such as wired or wireless transmitters and receivers, may be incorporated in or used in conjunction with a locator such as locator 100.

In operation, locator 100 is typically moved about above the ground surface (180 deg.) to attempt to locate a buried object 150, such as conduit or other buried pipe (shown in cross-section in FIG. 1), which runs into and out of the plane (i.e., out of the page) as shown in FIG. 1. The buried object or an element associated with a buried object (e.g., a wire, which may be commonly referred to as a "tracer wire," added to or placed adjacent to a non-conducting pipe) carries current, which may be inherent in the buried object (e.g., as in a buried power transmission line) or may be coupled to or induced into the buried object by a transmitter or other device.

The buried object 150 is located at a distance or depth $D_b$ relative to the surface of the ground 180, while the lower sensor element is positioned at a distance H above the ground surface. Since the buried object is sensed relative to the sensor location, an additional correction may be made to adjust the estimated depth to account for the offset of the sensors 111, 112, and 113 above the surface of the ground. For example, while the results from processing information from sensors 111, 112, and 113 (or other combinations of sensors and/or positions) may provide an estimate of the distance from the buried object to the position of the lower sensor 111 (i.e., D1 as shown in FIG. 1), the depth below the ground may be determined by subtracting a known or measured height, H, from a measurement referenced to the buried object by distance D1.

An operator moves the locator over the ground to determine positioning of the buried object (e.g. along the surface of the ground, in the X-Y plane or ground plane) as well as the depth of the buried object (Z or up/down axis). Depth may change as the buried object may have been placed in a trench or other excavated volume, and/or the terrain may change, thereby changing the depth of the buried object relative to the ground surface as the operator's position over the ground changes. Before digging or performing other operations that could affect the buried object, it may be very desirable to determine an estimated depth to the buried object at one or more positions, along with a surface map of the positions or path of the object along the surface as well as depth of the object below the surface.

One characteristic of the ground in many areas is that it is not homogenous. This may be due to various reasons, such as compaction, such as by a sheepsfoot tool, deposition, layering of different substrate materials over time and/or shifts or uplifts in the ground over time, excavation and backfill, amount of water provided to the ground and water penetration, construction near the ground surface, as well as for other reasons. These may result in anisotropic soil conditions—for example, trench backfill is usually inhomogeneous and anisotropic.

Figure 2:
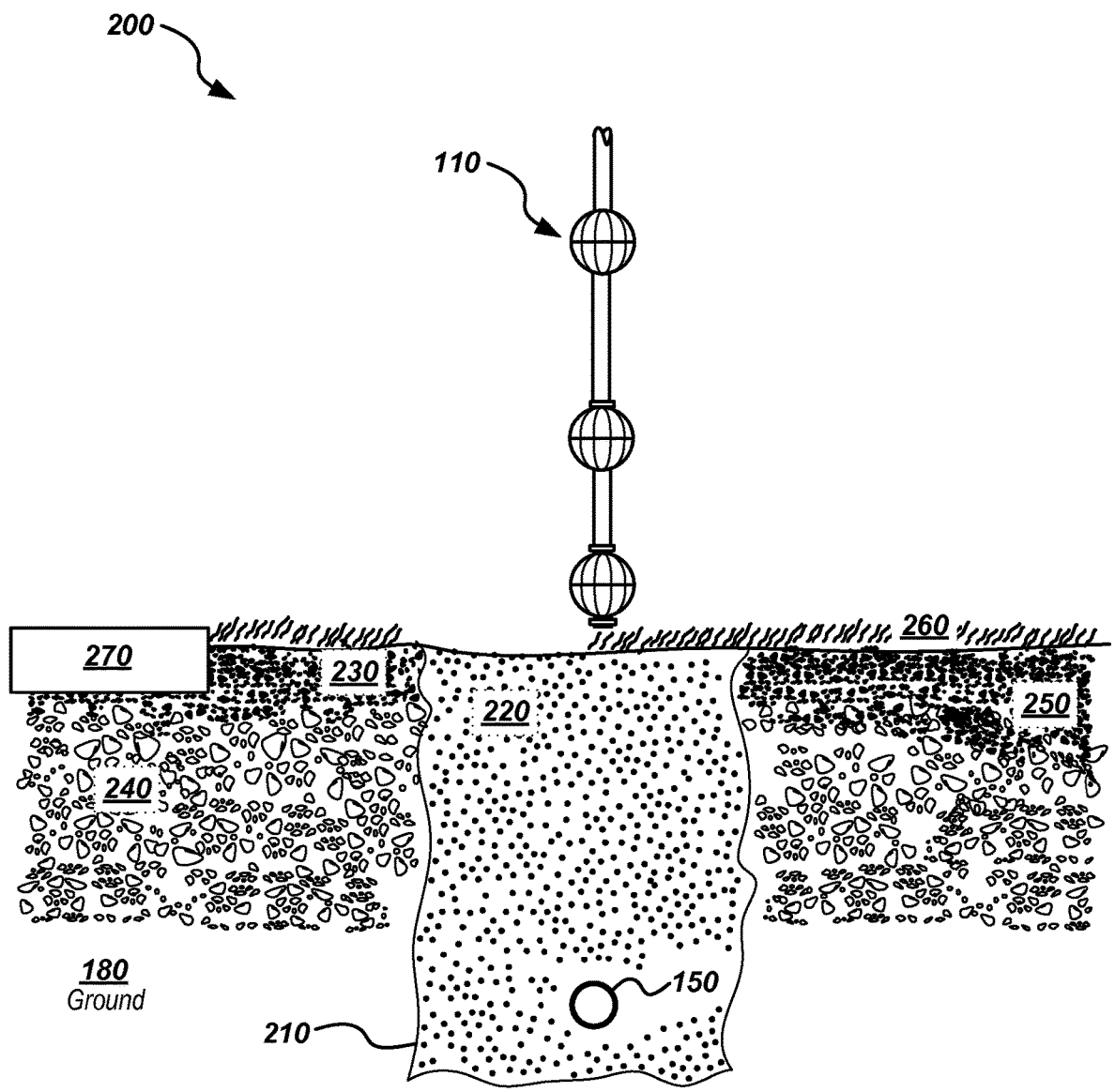
FIG. 2 illustrates details of example ground sub-surface features as may be encountered during a line tracing operation.

FIG. 2 illustrates a diagram 200 showing an example ground cutaway view with various elements that may affect ground homogeneity as well as associated ground conductivity, which affects current flow within the ground when measurements are being made with sensing assembly 110 of locator 100. For example, the ground may include a grass or turf surface 260, which may vary across the ground surface, and which may have various materials below it, such as compost, peat moss, fertilizers, etc., which may affect conductivity. Below the surface, the type of material, as well as the strike and slope (e.g., direction and angle) of material layering, may vary. For example, a first type of soil 230 or 250 may be near the ground surface, while a different type of soil 240 may be further below. Soils 230, 240, and 250 may include different minerals, etc. (e.g., sand, clay, rock, etc.), that may affect their conductivity.

Other differences in the ground structure may include a trench, such as trench 210 as shown, which may have been excavated to place buried object 150, and may be backfilled with a different material 220 than the surrounding soil (e.g., soils 230, 240, 250). In this case, the trench and backfill in proximity to the buried object may have small to large differences in conductivity than the adjacent soils.

Other features may also affect conductivity. For example, construction features, such as concrete sidewalk or slab 270, may be placed in the ground, further affecting the ground characteristics. In various locator operations, ground areas having one or more of these inhomogeneous characteristics (or others not specifically illustrated) may be present. Differences in ground characteristics may affect locator operation, such as by affecting return current flow (typically through the ground), distorting magnetic fields above the ground, or otherwise affecting the signals received by the locator's sensors.

Figure 3:
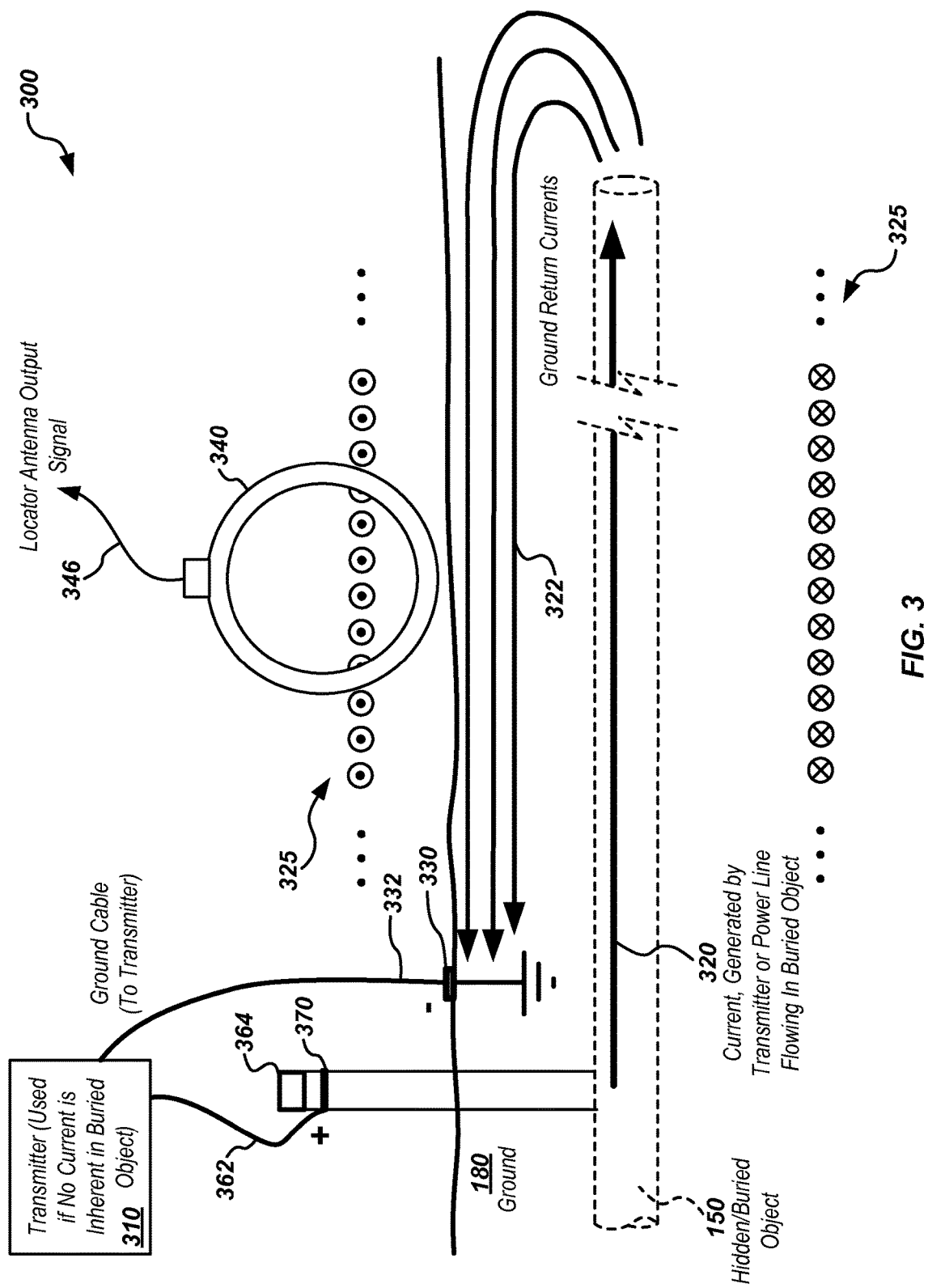
FIG. 3 illustrates details of example conductor and ground current flow in a buried object locator system during a line tracing operation.

FIG. 3 illustrates details of an example locator sensor (line tracing) operation above a buried object such as object 150. As shown in FIG. 3, the buried object may have a current coupled to it from a transmitter 310 as shown (e.g., via cabling and clamps/connectors 362 and 370) to an aboveground stub or other contact 364. In some cases, such as with buried transmission lines, current flow is inherent in the buried object, and therefore no signal need be coupled to the object as shown in FIG. 3. In some cases, currents may be induced onto the buried object, such as by low frequency commercial or military radio signals or other electromagnetic field sources.

Current 320 flows through the buried object as shown and eventually returns through the ground as ground return currents 322. If a transmitter is used, the ground return current 322 may flow to a stake or other object 330 in the ground, where it may then be coupled back to the transmitter via a cable 332. Return currents from buried power lines will similarly return to a source through the ground.

Magnetic fields 325, generated by current 320 flowing through the buried object conductor 150, may be measured by a magnetic field antenna/sensor 340, which may correspond with sensors 111, 112, and/or 113 of FIG. 1. The sensor outputs may be provided via a cable or printed circuit board connection 346 to additional processing electronics, which may be located in control unit 120. The magnetic fields will typically be sensed in multiple directions, such as in three orthogonal directions corresponding to the X and Y plane (the X and Y plane is approximately a local tangent to the geoid as shown in FIG. 3), as well as the Z axis (vertical in FIG. 3).

Based on the path of the return current 322 through the ground, an additional magnetic field component (now shown in FIG. 3), which may have a directional component opposite that of the outbound current 320, may be generated by the ground flow current. The ground flow current path will be dependent on a number of factors, including the ground characteristics (such as those described with respect to FIG. 2), as well as frequency, etc. In one aspect, embodiments of the present disclosure may be used to estimate these ground characteristics by taking multiple sensor measurements while moving around the vicinity of the buried object and matching the sensed values with position data obtained by inertial systems, GPS receivers, etc. In addition, a sheet current flow model may be used to generate an enhanced buried object depth measurement by adjusting for the ground return current, such as described subsequently.

Figure 4:
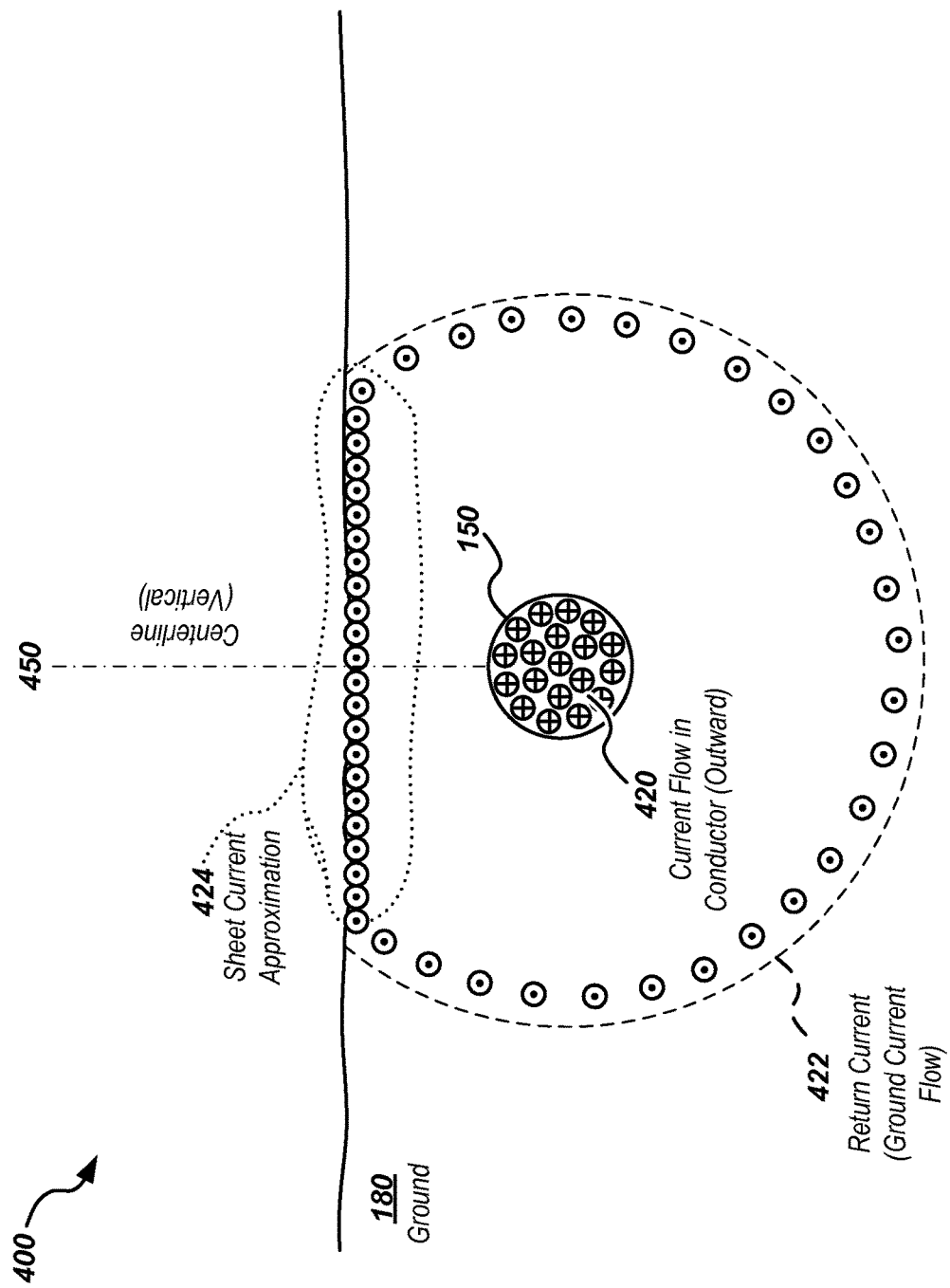
FIG. 4 illustrates details of one embodiment of a sheet current flow model for buried current flow in the ground.

Turning to FIG. 4, a diagram 400 showing details of an embodiment of a sheet current flow model that may be used to approximate the ground return current flow in the proximity of the buried object conductor 150 is shown. In general, a sheet current flow model includes a sheet current flow component and associated sheet current magnetic field, which is associated with ground return current flow, as well as a conductor current flow component and associated conductor current magnetic field, which is associated with current flow in the buried object, or, in the case of use of a sonde, magnetic fields associated with a dipole antenna disposed within or in proximity to the buried object.

For example, an outward current flow 420 (which may correspond to current 320 of FIG. 3) may be returned via ground return current 422 (which may correspond with current 322 of FIG. 3). Depending on the characteristics of the ground, a portion of the ground return current 424, which may be modeled as a sheet current, may be present at or near the ground surface as shown and may concomitantly generate a corresponding magnetic field. In some cases, the sheet current may be modeled as an infinite current sheet, depending on the ground characteristics and frequency. In other cases, the sheet current may be modeled as a finite current sheet, which may have tapered current values moving away from the centerline 450 of the buried object, or may otherwise be adjusted based on particular ground characteristics, which may be asymmetric about the centerline. Outward conductor current flow 420, which may be coupled to or induced in the buried object 150, or may be inherent (in the case of buried power transmission cables), generates a magnetic field component surrounding the buried object, which may likewise be sensed by the locator.

Figure 5:
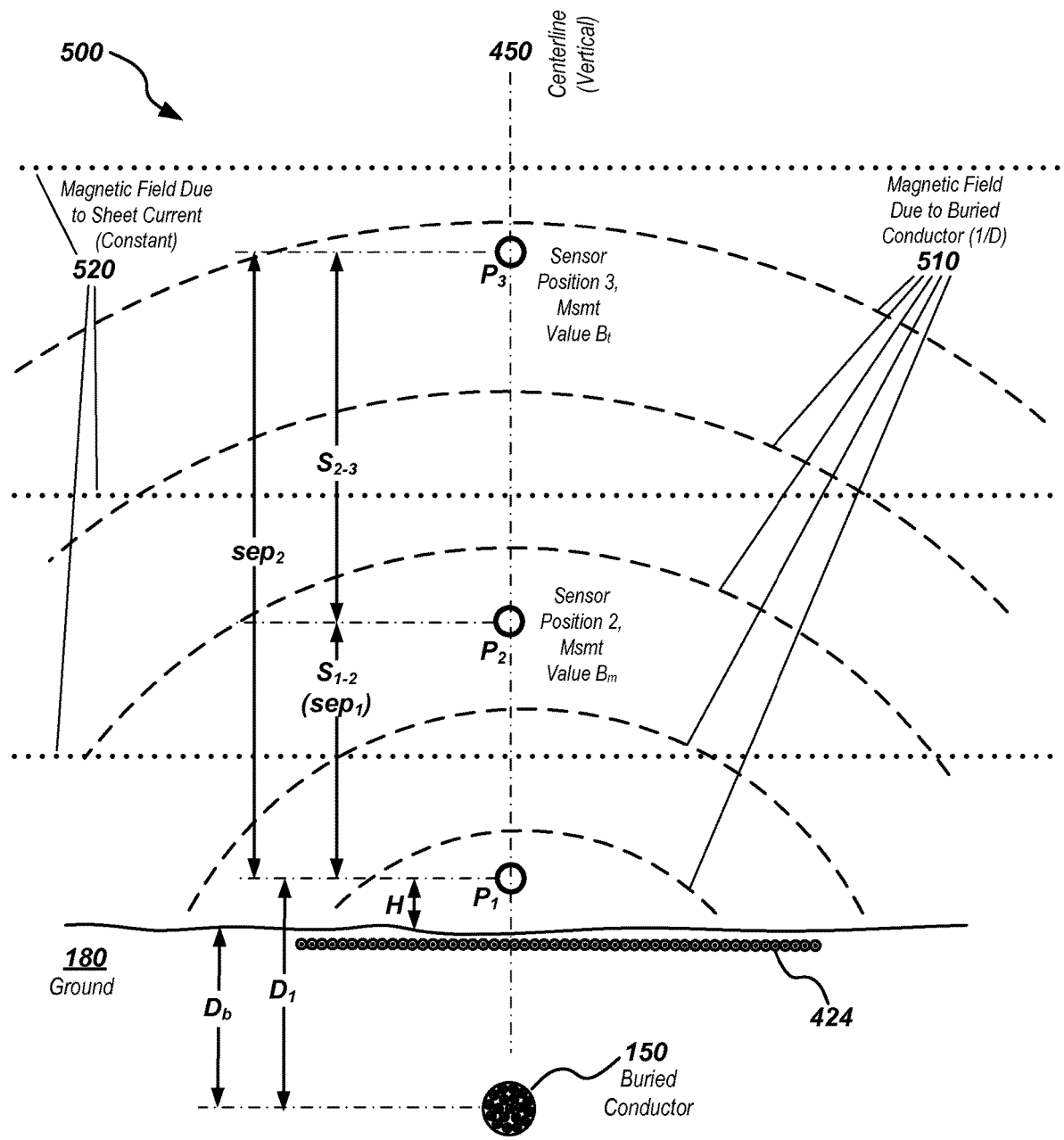
FIG. 5 illustrates details of example conductor current magnetic fields and sheet current magnetic fields in one embodiment of a sheet current flow model where magnetic field measurements are taken at three positions above a ground surface.

FIG. 5 illustrates a diagram of an embodiment 500 of a measurement configuration for determining an estimate of the depth of a buried object 150. In this configuration sensor measurements may be taken at three positions for use with a three magnetic field measurement sheet current flow model for determining an estimated depth of buried object 150. The three magnetic field measurement solution as shown in equation (1) may be used for this configuration. As shown in FIG. 5, three sensor positions, denoted as $P_1$, $P_2$, and $P_3$, approximately along vertical centerline 450 (approximately perpendicular to the ground surface or local geoid), where magnetic field measurements may be taken, are shown. The three positions may correspond with a single sensor moved between the three positions to take separate measurements, or for two or more sensors to take measurements at the three positions. In an exemplary embodiment, three magnetic field sensors may be used to simultaneously take measurements at the three points, such as in a three sensor locator, such as locator 100 as shown in FIG. 1; however, other numbers of sensors may also be used to take the three measurements in various embodiments, such as single sensor or two sensor locators. The centerline may be known, approximated, or measured, such as by using additional magnetic sensors in a horizontal orientation (not shown) to position the locator directly over the buried object. An example of this type of sensor configuration and operation is described in the incorporated applications and in particular in U.S. Patent Application Ser. No. 61/614,829, the content of which is incorporated herein by reference.

At each sensor position (e.g., $P_1$, $P_2$, and $P_3$), one magnetic field component $B_{cc}$ (representing the B-field generated by the conductor current (cc)) may be present that is generated by the buried object conductor 150. In some embodiments, the magnetic field component may be at multiple frequencies, which may be selected to provide enhanced resolution, distance/depth estimation performance, signal processing performance, or other functions. For example, in some embodiments, a transmitter, such as transmitter 310 as shown in FIG. 3, may be configured to provide current at multiple frequencies, such as two or more of the frequencies described previously with respect to FIG. 3. Example field lines 510 for the conductor current magnetic field are shown.

In addition, a second magnetic field component, $B_{sc}$ (representing the B-field generated by the sheet current (sc) component 424 of the ground current 322), generated by the sheet current, may also be present at each sensor position. In general, at each sensor position, a component of both the conductor current and sheet current will be superimposed to generate the resulting measured magnetic field at each point. Examples of these fields are shown as field lines 520, which, in accordance with one sheet current flow model, are substantially constant and independent of distance from the ground (i.e., approximate a constant field as would be generated by an infinite current sheet).

In general, it may be desirable to separate the first and second sensors and the second and third sensors by different distances in the vertical direction (and/or, in some embodiments, horizontal offsets (not shown)) of the sensor positions relative to the orientation shown in FIG. 5. The vertical separations or distances are shown in the example of FIG. 5 as $S_{1-2}$ and $S_{2-3}$, respectively. As described subsequently herein, these distances may be used in a closed-form solution model, where the closed-form model variable $sep_1$ corresponds with $S_{1-2}$, and the closed-form model variable $sep_2$ corresponds with $S_{1-2}+S_{2-3}$. In FIG. 5, the distance from the lower measurement position $P_1$, is typically a finite distance, H, vertically above the ground surface, and the vertical distance from the buried object 150 to position $P_1$ is a distance $D_1$. The depth of the buried object below the ground, $D_b$, may be determined by subtracting H from $D_1$. As described subsequently herein, the height, H, may be determined based on a known reference height above the ground, through use of a distance sensor or accelerometer-based distance measurement device, or by other distance measurement methods known or developed in the art. If a sensor is used, the distance information may be provided to a processing element of the locator, along with the magnetic field measurements, to solve for the estimated depth as described subsequently herein using sheet current flow model solutions.

In general, the magnetic field components $B_{cc}$ and $B_{sc}$ will vary differently as a function of the distance, $D_n$, between the buried object conductor 150 and sensor positions, $P_n$. Consequently, at each sensor position, the sensor reading may be represented as $B_{cc}(D_n)+B_{sc}(D_n)$ (e.g., the total magnetic field reading at each position is a sum of a first function representing $B_{cc}$ as a function of $D_n$ and a second function representing $B_{sc}$ as a function of $D_n$).

For example, for current flowing in a line conductor, the magnetic field drops off approximately proportionally to $1/D_n$ (the field may be affected, however, by various factors, including the frequency, ground conductivity and conductivity variation, etc.). Using this estimate, the $B_{cc}$ field at each sensor position is as follows (where $B_{cc}(D_n)[P_n]$ is the $B_{cc}$ value at position $P_n$):

$$B_{cc}[P_1] = k/D_1$$
$$B_{cc}[P_2] = k/D_2$$
(where $D_2 = D_1 + S_{1-2}$)

and:

$$B_{cc}[P_3]=k/D_3 \text{ (where } D_3=D_2+S_{2-3})$$

As noted previously, in some cases, the ground return sheet current may approximate an infinite sheet current. As is known, the magnetic field above an infinite sheet current is a constant. Consequently, in one embodiment, the $B_{sc}$ value is independent of $D_n$, and is the same constant value (denoted as $B_{const}$ at each sensor position). Using this sheet current flow model, the measured magnetic field value ($B_1$, $B_2$, and $B_3$) at each sensor position can be written as follows:

$$B_1 = k/D_1 + B_{const}$$
$$B_2 = k/D_2 + B_{const}$$
$$B_3 = k/D_3 + B_{const}$$

If sensor measurements (i.e., $B_1$, $B_2$, $B_3$) are taken at each position ($P_1$, $P_2$, and $P_3$), and the relative offsets between sensors 1, 2, and 3 ($S_{1-2}$ and $S_{2-3}$) and k are known or determined, the equations can be solved for $D_1$, which can then be converted to a depth measurement to the buried object 150.

One possible closed-form sheet current flow model solution to the above-described equation model that may be used to solve for a buried object depth estimate is described below: In this model, a closed form sheet current flow depth estimate solution may be implemented using (1) below:

$$D_b = \frac{(-B_m + B_t)*sep_1*sep_2}{-(B_t*sep_1) + B_b*(sep_1 - sep_2) + B_m*sep_2} - H \quad (1)$$

The variables for this closed-form sheet current flow model are (these variables are as shown in FIG. 5):

$D_b$ is the estimated depth of the buried object below the ground surface;

$D_1$ is the distance between the buried object and bottom sensor position ($P_1$);

$B_b$ is the measured magnetic field component at the bottom sensor position ($P_1$);

$B_m$ is the measured magnetic field component at the middle sensor position ($P_2$);

$B_t$ is the measured magnetic field component at the top sensor position ($P_3$);

$sep_1$ is the distance, $S_{1-2}$, between $P_1$ and $P_2$;

$sep_2$ is the distance, $S_{1-2}+S_{2-3}$, between $P_1$ and $P_3$; and

H is the height or distance of the lower sensor position, $P_1$, above the ground surface.

The three measurement position sheet current flow model solution described above was generated with the Mathematica software application. In an exemplary embodiment a three sensor locator may be used, however, a single sensor or two sensor locator may also be used with similar measurement and processing applied to measured magnetic field data. It is noted that the distance-related variables such as sep, $sep_1$ and $sep_2$, H, etc., need to be in the same units or converted during processing to consistent units. Likewise, current and magnetic field units need to be collected in or converted to consistent units, and parameters such as free space permeability and the sensitivities of the various sensors should be accounted for in processing.

Figure 15:
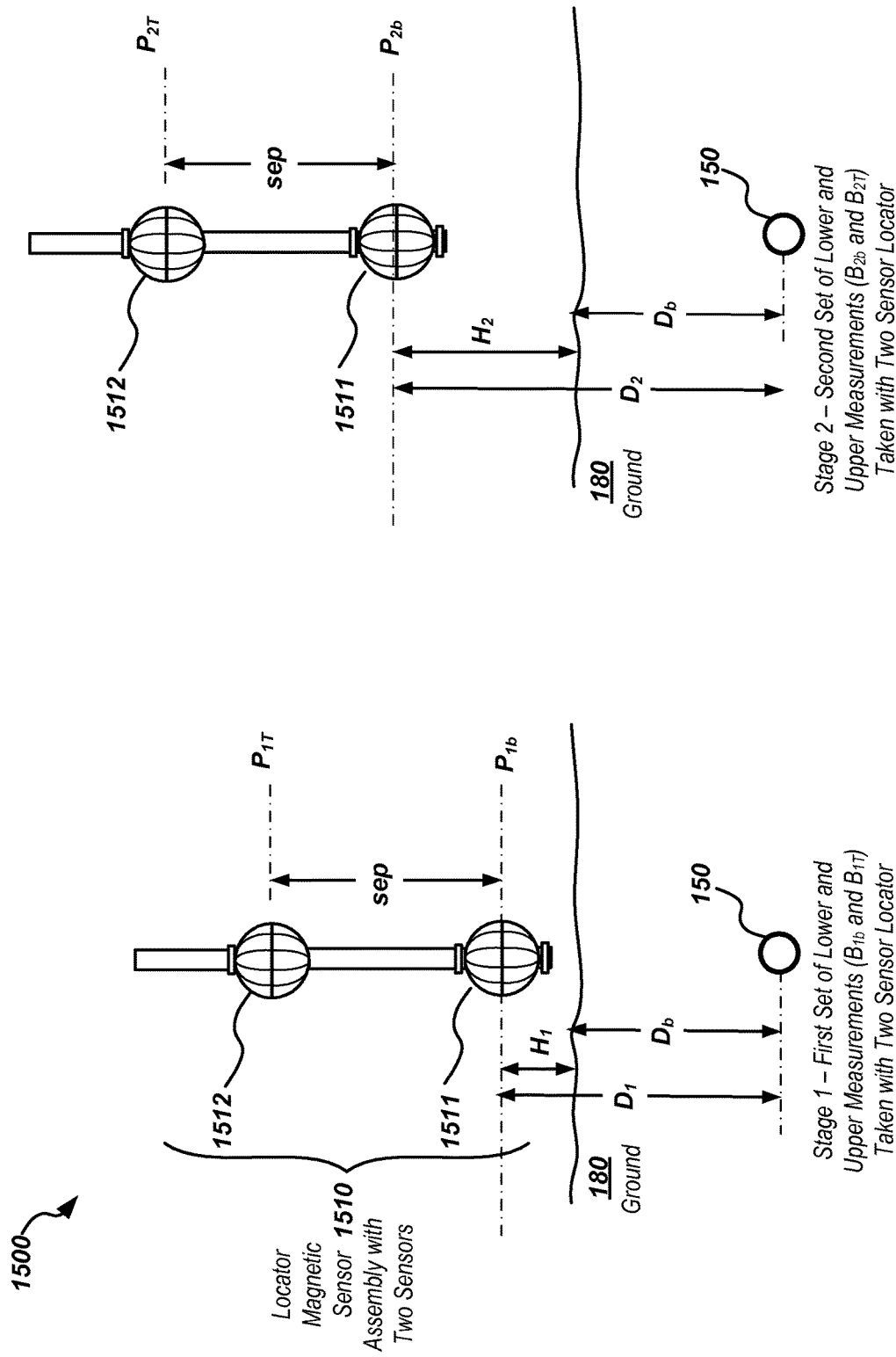
FIG. 15 illustrates details of an embodiment of measurement and processing for determining an estimated depth of a buried object using four magnetic field sensor measurements.

Another possible closed-form solution to the above-described equations that may be used is described below. In this model, it is assumed that four magnetic field sensor measurements are taken. In an exemplary embodiment, this may be done using a two sensor locator and taking a pair of measurements at different heights, as shown in FIG. 15 and described in process embodiment 1600 of FIG. 16. Alternately, a single sensor may take four separate measurements or other permutations of sensor arrays and measurements may be done (e.g., a three sensor locator taking two measurements to get at least four measurements at different positions, or a single sensor locator taking four measurements at different positions, etc.).

FIG. 15 illustrates additional details of an exemplary embodiment where a two sensor locator with a two sensor array 1510 is used. In this configuration, the locator array 1510 includes two ball-shaped omnidirectional magnetic field sensors 1511 and 1512, which are separated by a known distance or separation, sep. A buried conductor 150 is at a depth $D_b$ below the surface of the ground 180 as shown. At a first measurement stage, a first set of magnetic field measurements may be taken at a first height, $H_1$, above the ground with measurements taken at positions $P_{1b}$ and $P_{1T}$, corresponding to the positions of the bottom 1511 and top 1512 sensors. If the lower sensor is rested on the ground, the first height, $H_1$, may be a known value as a function of the locator geometry. For example, if the lower sensor is a ball assembly at the bottom of the locator (as shown), $H_1$ will be the ball radius, $r_{ball}$. In other embodiments, $H_1$ may be measured directly such as described herein using a distance measuring element such as an acoustic or optical distance measurement sensor, an accelerometer, or an electromechanical or other distance measurement element.

At measurement stage 2, the locator may be moved upward (vertically) as shown to height $H_2$ above the ground, and a second set of magnetic field measurements may be taken at positions $P_{2b}$ and $P_{2T}$.

These measurements may then be processed in a closed-form sheet current flow model of the form:

$$D_b = \frac{L+M}{N} - H_1 \quad (2)$$

Where:

$$L = (B_{1b} - B_{1T}) * (B_{1T} - B_{2T}) * (B_{1b} + B_{1T} - B_{2b} - B_{2T}) * sep \quad (3)$$

$$M = \sqrt{(B_{1b} - B_{1T}) * (B_{1b} - B_{2b}) * (B_{1T} - B_{2T}) * (B_{1b} + B_{1T} - B_{2b} - B_{2T})^2 * (B_{2b} - B_{2T}) * sep^2)} \quad (4)$$

$$N = (B_{1b} - B_{1T}) * (B_{1b} + B_{1T} - B_{2b} - B_{2T}) * (B_{1b} - B_{1T} - B_{2b} + B_{2T}) \quad (5)$$

And where the variables for this model are:
- $B_{1b}$ is a first magnetic field measurement taken at the lower or bottom ball of the two balls;
- $B_{1T}$ is a first magnetic field measurement taken at the upper or top ball of the two balls;
- $B_{2b}$ is a second magnetic field measurement taken at the lower or bottom ball of the two balls;
- $B_{2T}$ is a second magnetic field measurement taken at the upper or top ball of the two balls;
- sep is the distance between the lower and upper sensors/antenna balls;
- $H_1$ is the distance of the lower sensor above the ground at the first measurement position.

Figure 16:
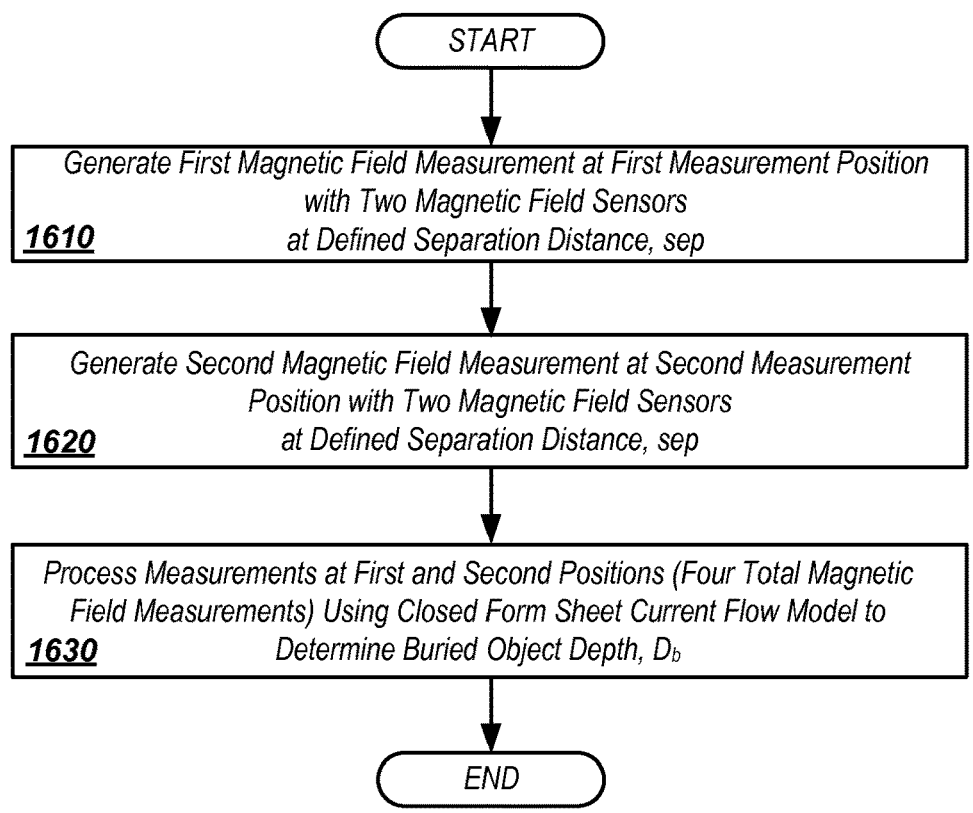
FIG. 16 illustrates details of an embodiment of a process for determining a buried object depth using measurements as shown in FIG. 15.

FIG. 16 illustrates a corresponding embodiment of a process 1600 for performing a buried object depth estimate corresponding to the example shown in FIG. 15. Process 1600 may begin at stage 1610, where a first set of magnetic field measurements (at two points relative to a first measurement position) are taken. The two points may be separated by a known distance, sep, which may be the fixed distance between two magnetic field sensors on a locator sensor assembly, such as assembly 1510 of FIG. 15.

At stage 1620, the locator may be moved upward (or in some uses, downward) to a second measurement position. A second set of magnetic field measurements at two points may be then be taken. At stage 1630, the measurement taken at the first and second locator positions may then be processed using a sheet current flow model solution such as described previously herein in equations (2)-(5).

The two sensor, two measurement position sheet current flow model solution described above was similarly generated with the Mathematica software application. A two sensor locator is assumed, with vertical navigation used to get magnetic field measurements at four positions as shown in FIG. 15. It is noted that, in other configurations, locators having three or more antenna/sensors could be used to take simultaneous measurements, single antenna/sensor locators could be used to take four or more measurements, or other permutations could also be used.

At locator position 1 (i.e., a two sensor locator taking measurements at top and bottom positions), measurements $B_{1b}$ and $B_{1T}$ are taken. The locator is then moved to a second position, where two additional measurements, $B_{2b}$ and $B_{2T}$ are taken. Based on these four measurements and using the sheet current flow model (which in this example assumes an infinite sheet current with a constant magnetic field component and a conductor current having a 1/D magnetic field component in the horizontal direction) the resulting distance/depth determination as shown in FIG. 15 can also be determined as:

$$D_1 = \frac{(B_{1T} - J_{sheet}) * sep}{B_{1b} - B_{1T}} \quad (6)$$

$$D_2 = \frac{(B_{2T} - J_{sheet}) * sep}{B_{2b} - B_{2T}} \quad (7)$$

and the sheet current, $J_{sheet}$, is given by:

$$J_{sheet} = \frac{(B_{1T} + B_{2b} - B_{2T}) * J - B_{2b} * B_{2T} * sep + B_{1b}(-J + B_{1T} * sep)}{(B_{1b} + B_{1T} - B_{2b} - B_{2T}) * sep} \quad (8)$$

where J is the current flowing in the buried object/wire and sep is the separation between the top and bottom sensors. This solution assumes that J and sep are non-zero.

In the case where the lower sensor is a ball or sphere-type omnidirectional magnetic field sensor and the ball is position on the ground, $D_b$ is approximately $D_1$, differing only by the distance from the sensor's sensing position (e.g., the center of a sphere when a ball-type sensor is used) to the ground, or the ball's radius, $r_{ball}$. In this case, with the ball radius known, $D_b$ can be solved as:

$$D_b = D_1 - H_1 = D_2 - H_2 = D_1 - r_{ball} \quad (9)$$

In some embodiments, depth estimates may be determined by using two or more processing methods and cross-checking the results. For instance, in the above example, which uses a buried object and actual collected data, where actual depth was 1600 millimeters, the $D_1$ depth estimate is 1618 mm, and the $D_2$ depth estimate is 1719 millimeters. These results were an improvement over the traditional depth estimate results of 1378 mm, and 1451, respectively, using traditional processing algorithms.

Collection of magnetic field measurement data for processing of measurement data as described above for the three or four measurement point solutions described above may be done in various ways. For example, a single locator with three sensors may be used to collect three measurements and, if the locator is positioned so the lower sensor is at a known distance above the ground (e.g., H), such as by being in contact with the ground, then the three magnetic field measurements may be processed in accordance with sheet current flow model equation (1) to determine the estimated depth to the buried object. Alternately, if a three sensor locator is used and the locator is positioned at some distance above the ground, the distance to the ground may be measured via any of a variety of distance measuring devices such as a mechanical device (e.g., rod, measuring stick, etc), optical device (e.g., laser, infra-red), acoustic measurement device, inertial/accelerometer-based, or other distance measurement device known or developed in the art. Combining the distance measurement from the locator to the ground with the three magnetic field measurements similarly allows solution of the buried depth estimate using equation (1). A single sensor locator could similarly be used to collect three (or more) measurements and associated distance information and may be similarly processed using equation (1) or another closed or open-form sheet current flow model solution.

If a two sensor locator is used, pairs of measurements may be collected at two locator positions, as shown in FIG. 15. These measurements may then be processed using the sheet current flow model solution of equations (2)-(5). If the first measurement set is taken with the lower sensor ball on or at a known position relative to the ground, no additional distance measurement need to be taken in order to solve for the buried object depth estimate. If more than two sensors or more than two locations are used, these additional measurements can be used to calculate a mean estimate of the burial depth and characterize the quality of the measurement by calculating the variance as well as higher order cumulants. These statistical properties can be compared against an external specification for generation of a quality metric of the measurement which may be stored and/or displayed to a user on the locator.

Alternately, a three sensor locator, such as shown in FIG. 1, could be used to do similar processing to that done by the two sensor locator of FIG. 15, with just two of the three measurements taken at each position used. This can similarly be done without specific distance measurement elements if the lower sensor is placed on or at a known position relative to the ground, or, alternately, with use of a distance measurement sensor to provide distance information associated with the magnetic field measurements. In the two sensor locator example, it is noted that the four measurements should be at different positions and that it is theoretically possible for a locator to be raised such that the lower sensor ball at the second measurement position is at the same point as the upper sensor ball was at the previous measurement. In a typical two-axis locator, the sensor balls are sufficiently far apart that it would normally be difficult to raise the locator to such an amount that the lower and upper balls would overlap in position, and therefore this condition would be unlikely to occur. However, it may be useful to configure the locator and sensor measurements such that measurements taken in such a configuration are non-possible or an operator warning or rejection of the measurement is indicated if it does occur.

In addition, combinations or repeated measurements using the above-described solutions may be used to provide multiple depth estimates that can be averaged or otherwise aggregated. For example, a three sensor locator may perform two sheet current flow model solutions, with one based on a three measurement solution and one based on a four measurement solution.

Figure 6:
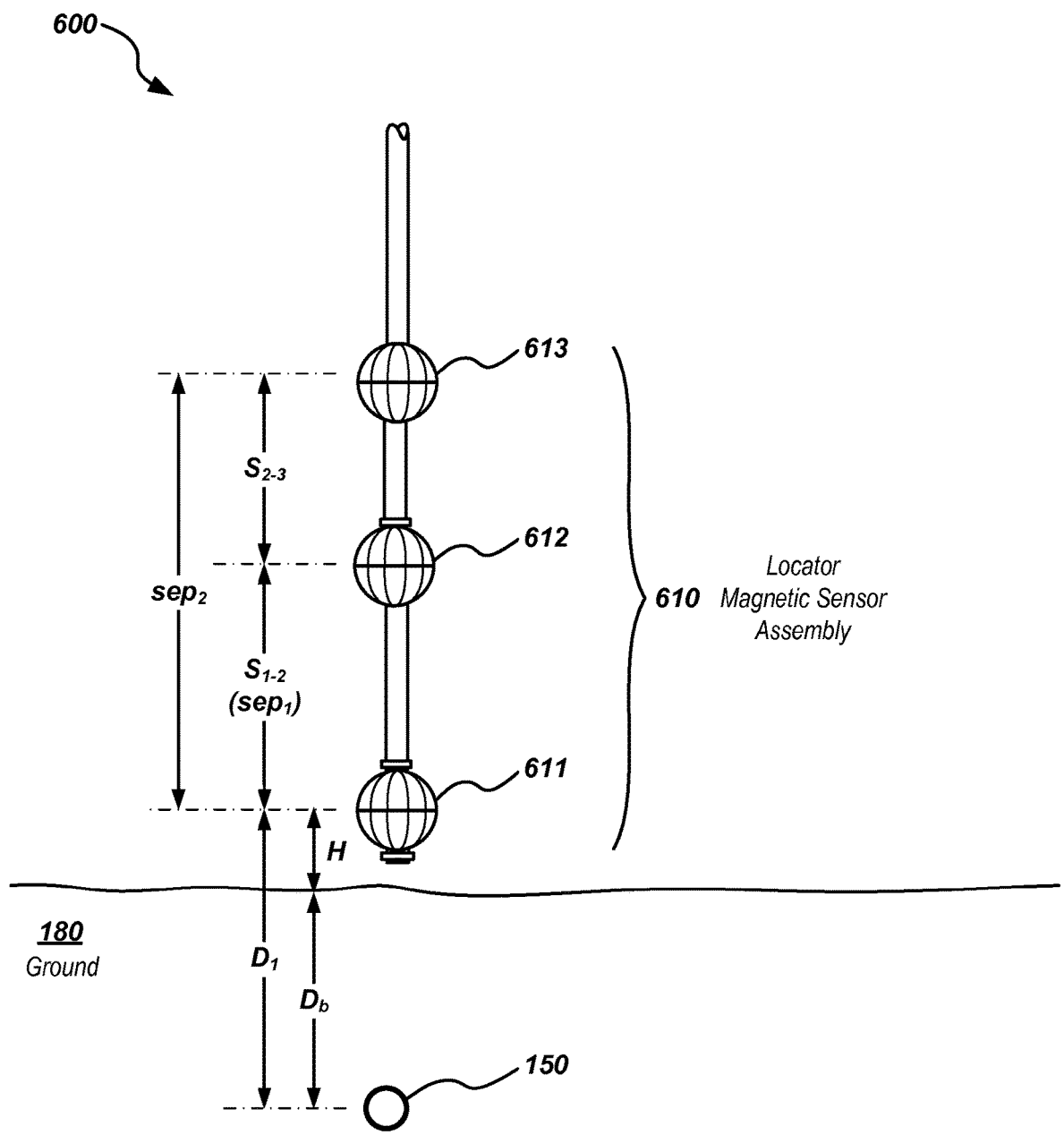
FIG. 6 illustrates details of an example embodiment of a three sensor buried object locator magnetic field sensor line tracing operation.

FIG. 6 illustrates details of an example measurement operation using a three sensor locator to determine an estimate of the depth, $D_b$, of a buried object 150 below the ground 180 surface. The lower part of a locator 600, which may correspond with locator 100 of FIG. 1, includes a mast and a three magnetic sensor assembly 610 including ball-type omnidirectional magnetic field sensors 611, 612, and 613 which may be non-uniformly spaced on the mast as shown by dimensions $S_{1-2}$ and $S_{2-3}$. Calculations using a sheet current flow model may be used as described herein to solve for the distance $D_1$, to the lower sensor, such as through use of the sheet current flow model solution of equation (1) as described previously herein. The height of a reference point on the sensor assembly above the ground is denoted by H, and, if the locator is positioned in contact with the ground, H will be equal to the radius of the ball or sphere of the lower sensor 611 when the magnetic field measurement point is at the center of the sphere. The depth, $D_b$, can be estimated by subtracting H from $D_1$ as described previously.

Figure 7:
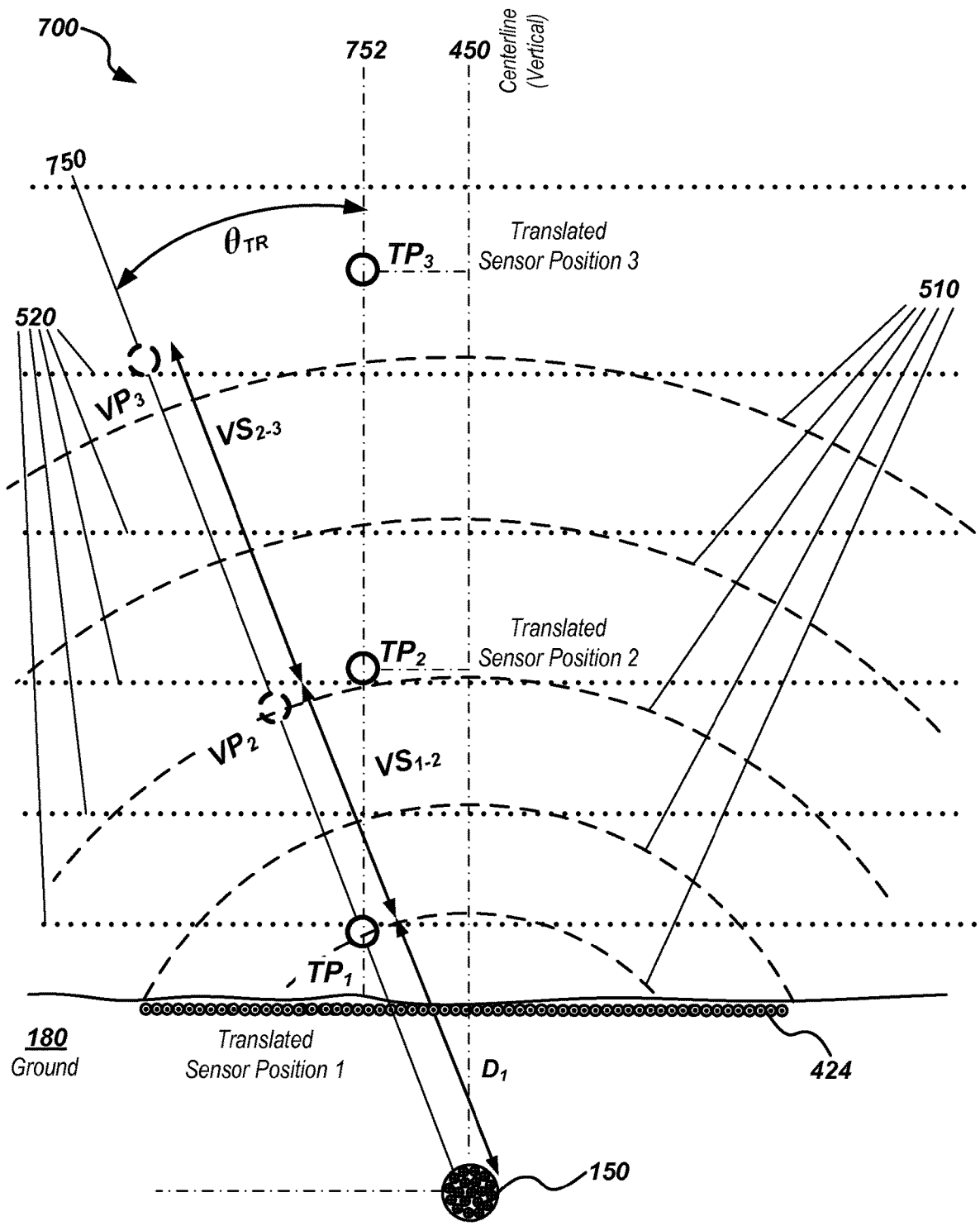
FIG. 7 illustrates details of a process for determining the depth of a buried object in a locator using a sheet current flow model with sensors rotated at a slight angle from a buried object vertical centerline.

FIG. 7 illustrates a diagram of an embodiment 700 of an alternate measurement configuration for determining an estimate of the depth of a buried object 150. In this configuration an estimated distance/depth of a buried object below ground is based on measurements at virtual positions (e.g., when the locator is offset from the vertical centerline and/or rotated relative to vertical). In the example configuration of FIG. 7, it is assumed that a locator is positioned offset from a centerline 450 of the buried object (e.g., to the left or right when viewing the buried object in cross-section as shown). Three measurement positions, denoted as translated positions 1, 2, and 3 ($TP_n$) correspond with the location of sensor elements of the locator when translated from a position over centerline 450. In addition, 2 virtual positions ($VP_n$) may be defined corresponding to a radial 750 outward from the buried object conductor 150. Solving for the a distance estimate along radial 750 may be done similarly to that described previously with respect to FIG. 5 using a sheet current flow model, with an additional step of determining an angle of rotation of the translated positions, denoted as $\theta_{TR}$, and determining an estimate of the magnetic field components associated with the sheet current flow model (e.g. the magnetic field model for the buried object conductor current and sheet current) at the virtual positions. In an exemplary embodiment, if the sheet current is estimated as infinite as described previously, the sheet current magnetic field component will be a constant, thereby requiring only an additional estimate of the magnetic field of the buried object conductor 150 at the virtual positions $VP_2$, $VP_3$ along with $TP_1$.

Figure 8:
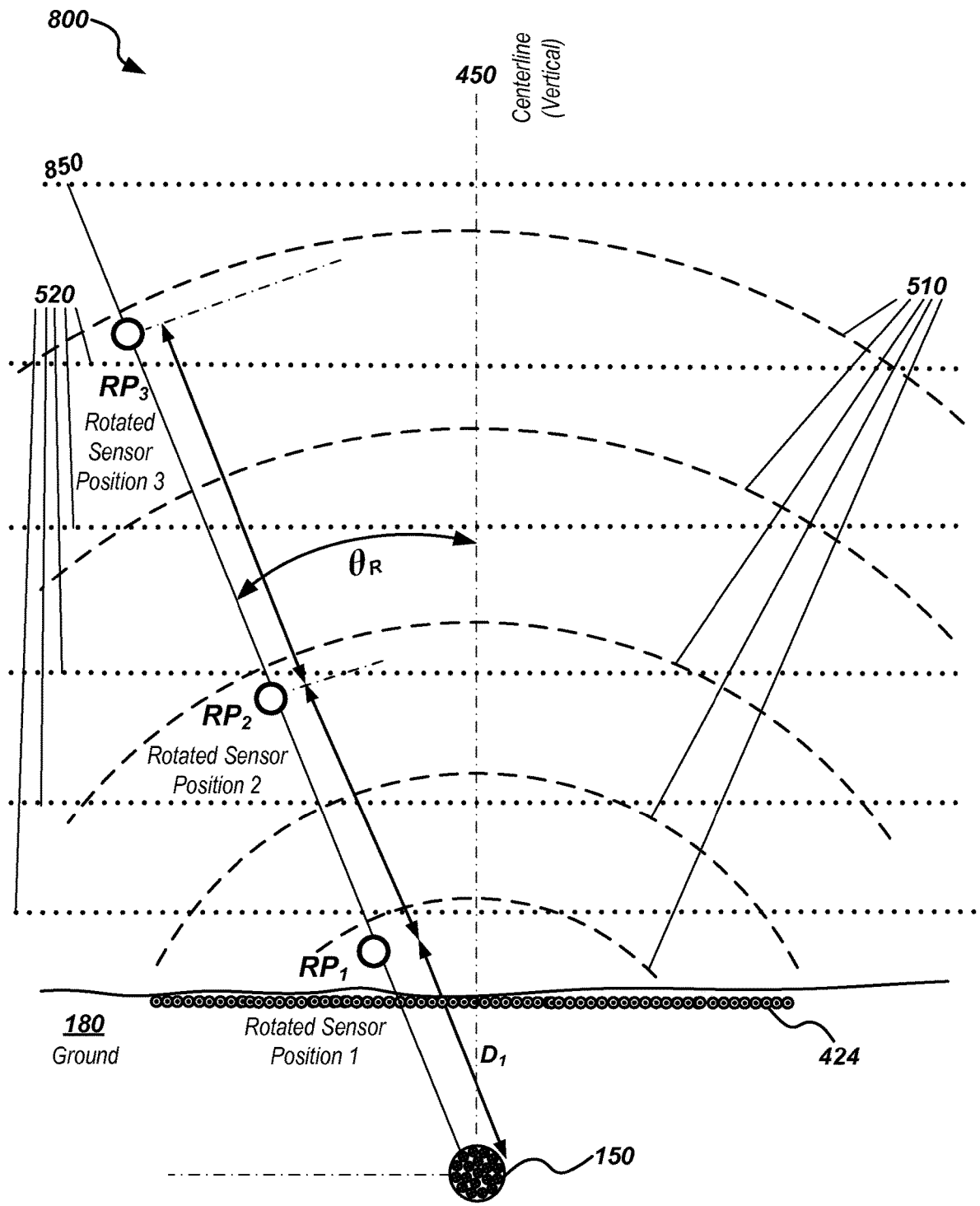
FIG. 8 illustrates details of a process for determining the depth of a buried object in a locator using a sheet current flow model with sensors at an offset translated position from a buried object centerline.

FIG. 8 illustrates a diagram of an embodiment 800 of an alternate measurement configuration for determining an estimate of the depth of a buried object 150. In this configuration an estimated distance/depth of a buried object below the ground surface is based on sensor measurements made at an offset rotation/angle. In the example of FIG. 8, it is assumed that a locator is rotated at an angle $\theta_R$ from a centerline 450 of the buried object (e.g. rotated to the left or right, at an angle from the centerline relative to an axis passing through the buried object conductor 150). In this example, three measurement positions, denoted as rotated positions 1, 2, and 3 ($RP_n$) correspond with the location of sensor elements of the locator when rotated from the centerline 450 along radial 850. By determining the angle $\theta_R$ and taking sensor measurements at the three rotated positions ($RP_1$, $RP_2$, and $RP_3$), the measurements can be processed similarly to the processing described with respect to FIG. 5 using a sheet current flow model to determine a distance/depth estimate. Since the magnetic field vector will become increasing distorted relative to the field taken in a vertical orientation, analytical results suggest that the accuracy of the solution in the configuration of FIG. 8 will decrease as the angle $\theta_R$ increases. Consequently, it may be desirable to limit the rotation angle to ten degrees or less in order to obtain reasonably accurate results using this approach.

In some embodiments, processing such as described with respect to FIGS. 5, 7, and 8 may be combined, depending on the type of locator and/or locator orientation, to determine the depth estimate. For example, a locator may be both offset and rotated relative to a centerline, in which case, a combination of translation and rotational processing, such as described with respect to FIGS. 7 and 8, may be used.

Figure 9:
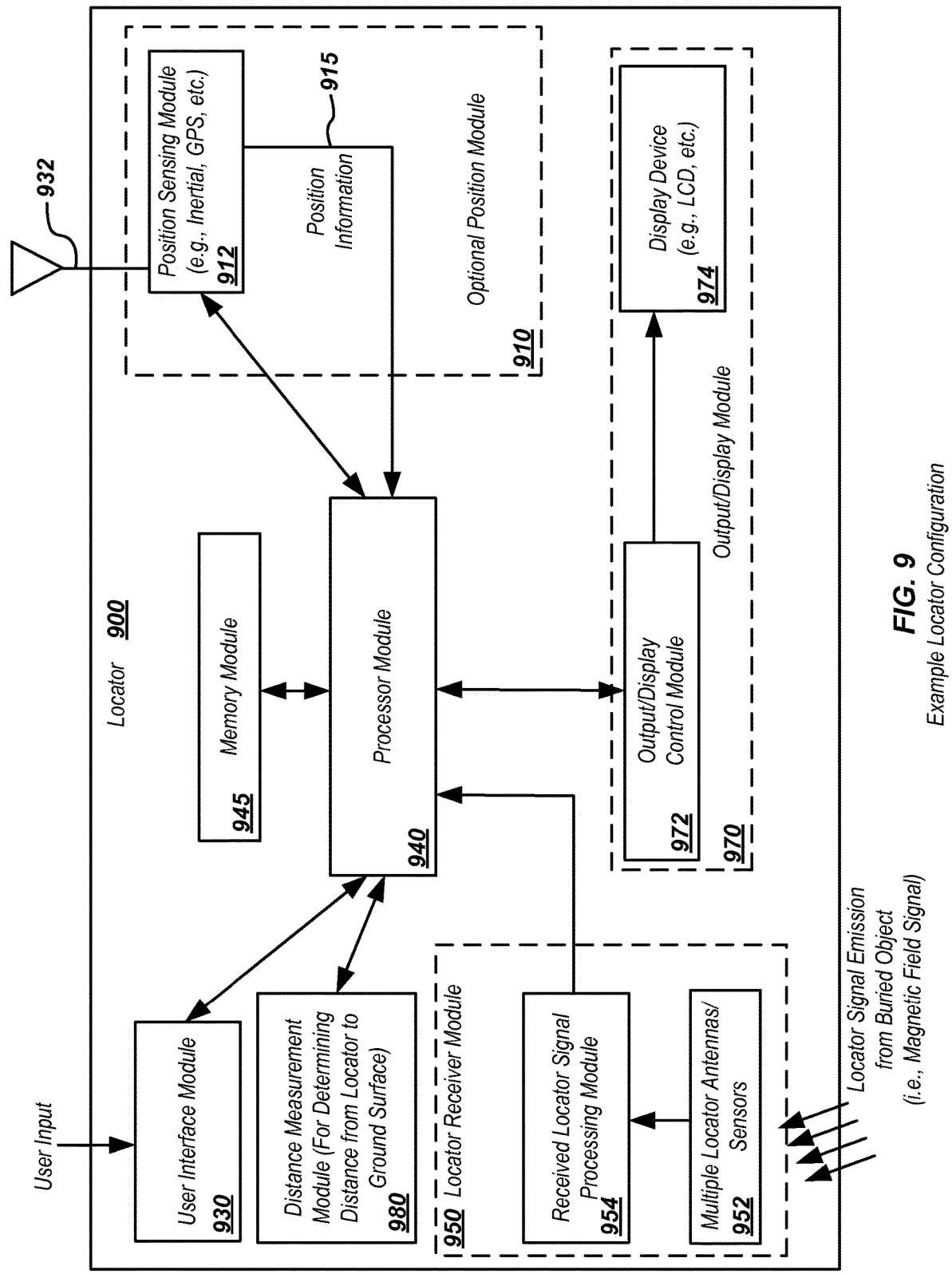
FIG. 9 illustrates details of an embodiment of a buried object locator for use in determining an estimated depth of a buried object by processing magnetic field measurements in accordance with a sheet current flow model.

FIG. 9 illustrates details of an embodiment of a locator 900 on which various aspects as described herein may be implemented. Locator 900 may include, for example, a locator receiver module 950, which may include one or more magnetic field antennas/sensors, such as sensors 111, 112, and 113 of FIG. 1, or other magnetic field sensors described herein, along with additional electronics, such as signal conditioning circuits (not shown), signal processing module(s) 954, to further process the signals, such as to filter the signals, digitize them, or perform other signal processing functions, as well as additional components, such as housings, etc. (not shown). In an exemplary embodiment, sensors 952 are multi-axis sensors configured to perform simultaneous magnetic field sensing in two or more axes (typically three).

A user interface module 930 may be included to allow users to enter locator parameters, such as frequency selections, sensor configuration information, display information, and/or other data or information. An output/display module 970 may be included to provide output to a user, such as graphical information related to a locate operation, mapping details or information, audible information such as tones, synthesized voice output, and/or other data or information. Output module 970 may be part of or integrated with user interface module 930 in some embodiments.

Locator 900 may include a processor module or element 940, which may include one or more processing devices such as microprocessors, microcontrollers, digital signal processors, FPGAs, ASICs, and/or other programmable devices. In addition processor module 940 may include peripheral components, such as analog-to-digital converters, I/O (input/output) devices, communication modules, such as wireless, USB, Ethernet modules, etc., data storage modules, peripherals for providing data output, such as USB ports for use with USB memory devices, and the like. Processor module 940 may include and/or be coupled with one or more memory modules 945, which may be configured to store instructions for execution on the processor to perform functions as described herein, as well as to store locate data, data being processed in the device, and/or other data or information, such as location information, additional sensor information, environmental information, or other information. An optional position module 910 may be included to provide position information 915 to the processor module 940 and/or memory module 945. The positional information may be generated by position sensing module 912 devices such as inertial navigation devices (accelerometers, gyroscopic devices, etc.), compass devices, and/or other position sensing devices, such as GPS modules or other radionavigation modules. In operation, locator 900 may be configured to allow processor module 940 to receive sensor information from multiple sensor positions, such as those described previously with respect to FIGS. 6, 7, and 8, and determine information related to the buried object conductor (or a sonde, not shown), including a depth estimate below the ground.

Figure 10:
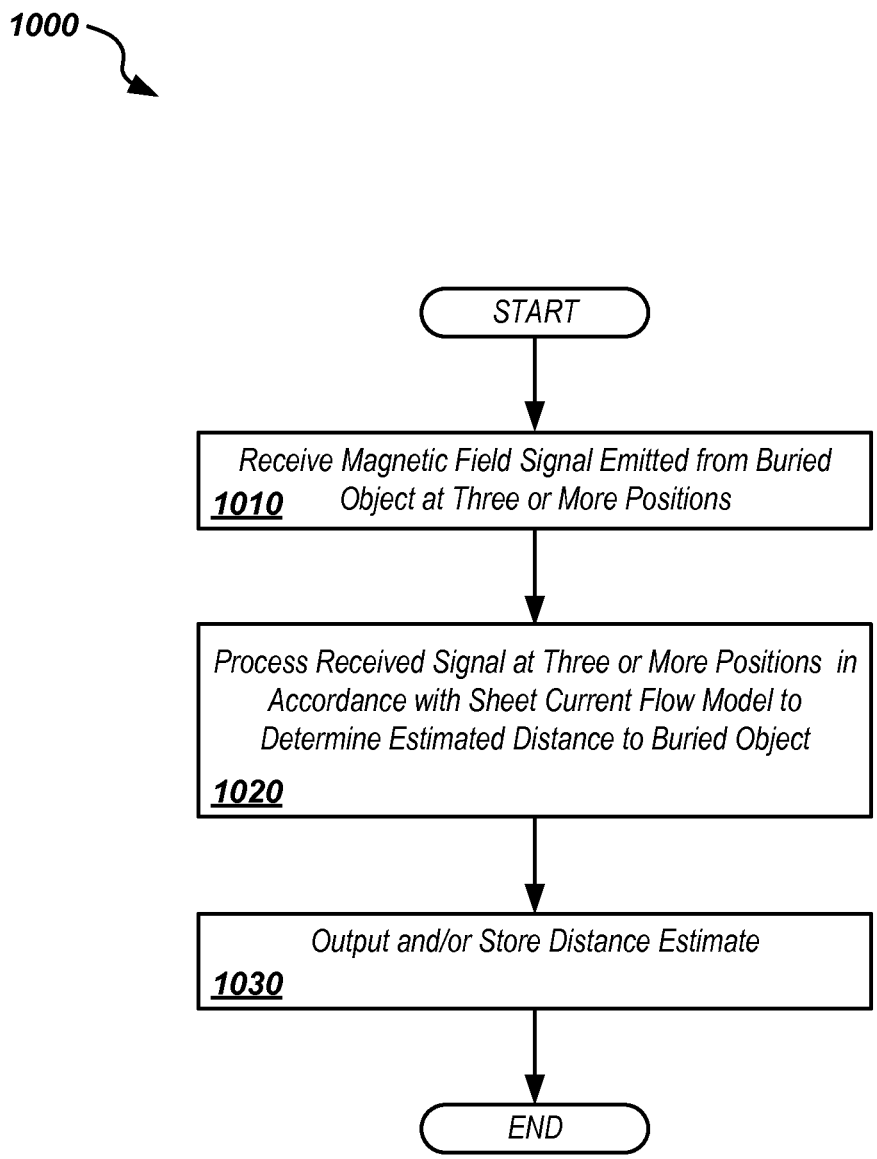
FIG. 10 illustrates details of an embodiment of a process for determining an estimated depth of a buried object based on three or more magnetic field measurements at different positions using a sheet current flow model.

FIG. 10 illustrates details of an embodiment of a process 1000 for determining an estimated depth to a buried object conductor. Process 1000 may be used in locator device configurations, such as shown in FIGS. 1, 5, 6, 7, and 8, and may be implemented in a processor and memory element, along with coupled sensors, such as shown in FIG. 9.

At stage 1010, one or more sensors may receive magnetic field signals from a buried object (or sonde) at three or more positions. In some embodiments, a single locator having three sensors may be used to simultaneously collect the magnetic field measurements. In other embodiments, a locator having one magnetic field sensor may collect magnetic field measurements at multiple positions. The position information may be determined by, for example, a position sensing module, such as module 912 as shown in FIG. 9, or by other position sensing methods, such as based on predetermined offsets, mechanical or electrical position determination mechanisms, or by other position sensing methods.

At stage 1020, the received magnetic field signals at three or more positions may be processed, such as by use of a processor element such as element 940 of FIG. 9 in conjunction with memory 945, in accordance with a sheet current flow model approximation, to determine an estimated distance/depth to a buried object. The sheet current flow model may include two or more magnetic field components, which may include a sheet current approximation magnetic field component and a conductor current approximation magnetic field component. For example, the sheet current approximation may be based on an infinite sheet current, resulting in a constant term, and the conductor current approximation may be based on a current flowing in a straight conductor. Other sheet current flow models may be used, such as, for example, a model including a non-infinite current sheet, which may vary as a function of distance relative to the buried object. In addition, the conductor current approximation may be based on a sonde magnetic field model, or other conductor current magnetic field model different from the magnetic field model associated with an infinite straight conductor approximation. Additional positional information may be provided and used, such as location information provided from inertial, compass, and/or GPS devices, to further enhance the distance estimate.

Additional processing, such as to adjust for translation positions, determine estimates of magnetic field at virtual positions, determine depth based on a rotational offset from a centerline, and/or other adjustments may be further performed to determine the distance estimate.

At stage 1030, the distance estimate may be saved to a memory and/or output, such as on a storage device such as a USB thumb drive, and/or may be displayed on a user interface device, such as an LCD display, as audio output, as text-based output, and the like. In some embodiments, the buried object information may be combined with the position information and mapping information to provide data and/or maps of buried object depths, locations, etc., combined with location information.

In an exemplary embodiment, a closed form solution of the distance determination process may be implemented, such as in processing element 940 and in conjunction with memory module 945, to efficiently solve for the distance/depth estimate to the buried object. Alternately, or in addition, open form solutions, such as iterative solutions, numerical approximations, and/or other non-closed form solutions may be implemented to determine the depth estimate.

Figure 11:
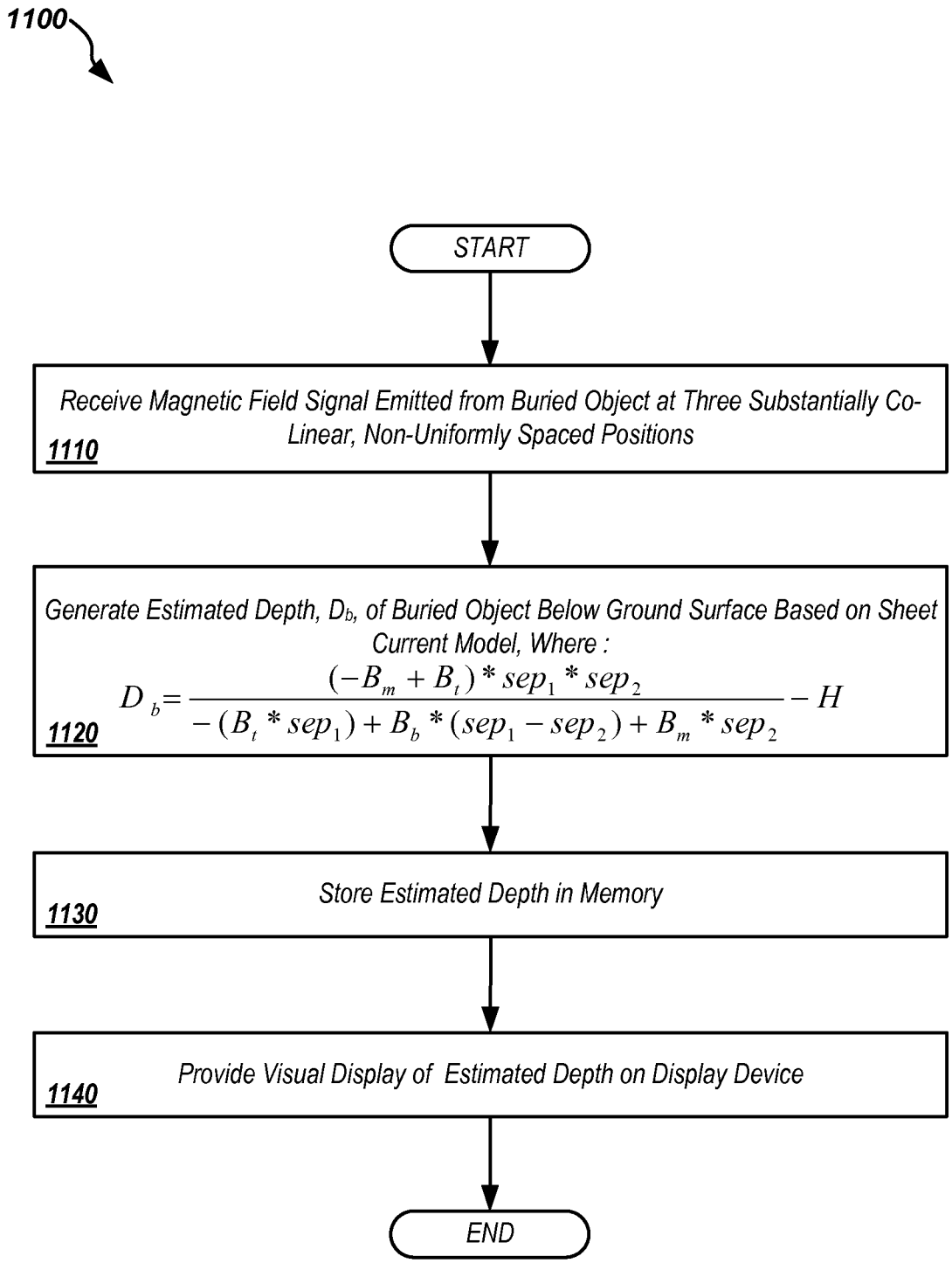
FIG. 11 illustrates details of an embodiment of a process for determining an estimated depth of a buried object based on three magnetic field measurements using a closed-form three measurement sheet current flow model.

FIG. 11 illustrates details of another process embodiment 1100 for determining a depth estimate to a buried object based on three measurements taken either simultaneously using three or more sensor elements or sequentially using one or two sensor elements. Process 1100 may be implemented in a three sensor locator, such as those shown in FIG. 1 or 6, and implemented in processing circuitry such as shown in FIG. 9. At stage 1110, magnetic field signals emitted from the buried object may be measured. In an exemplary embodiment, the measurements are taken at non-uniformly spaced positions substantially along a vertical line intersecting the buried object, however, the measurements may, in some embodiments, be taken at uniformly spaced positions and/or offset from vertical as described with respect to FIGS. 7 and 8. If the locator is initially positioned on the ground H may be determined based on the known distance from the bottom of the locator to a reference position, such as the sphere radius if the lower sensor is a spherical magnetic field sensor. Alternately, distance information may be provided from a separate distance sensor element.

At stage 1120, the three magnetic field measurements and associated distance measurements may be processed using a closed form sheet current flow model of the form of equation (1) as described previously herein, where the depth estimate, $D_b$, is determined as:

$$D_b = \frac{(-B_m + B_t)*sep_1*sep_2}{-(B_t*sep_1) + B_b*(sep_1 - sep_2) + B_m*sep_2} - H$$

At stage 1130, the depth estimate may be stored in a memory of the locator and/or sent to an external electronic computing system. At stage 1140, a visual display of the depth estimate may be provided on a display device of the locator, such as in a graphic user interface (GUI) display in a graphic and/or numeric format.

Figure 12:
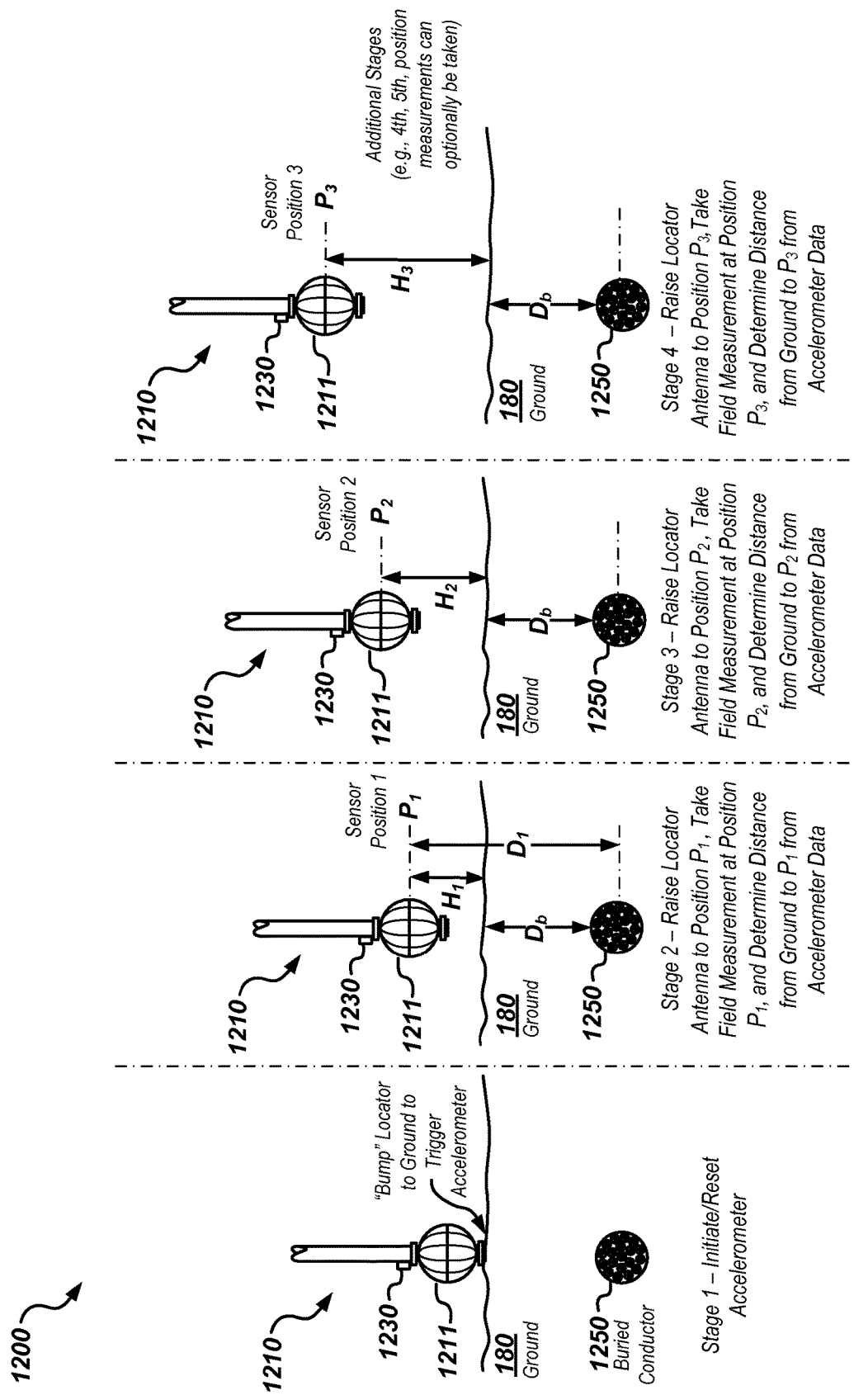
FIG. 12 illustrates details of a process for determining an estimated depth of a buried object based on three magnetic field measurements taken with a single magnetic field sensor and inertial position sensing using a sheet current flow model.

FIG. 12 illustrates an example embodiment 1200 of processing magnetic field measurements and generating associated distance information using an accelerometer element 1230 in a buried object locator to determine an estimated depth to a buried object 1250. The accelerometer 1230 may be disposed on or within a magnetic sensor assembly 1210 mast or sensor element, or elsewhere on or in the locator (not shown). In the embodiment shown in FIG. 12, the accelerometer is positioned near a sensor 1211. In operation, at Stage 1, a user may bump or tap the locator onto the ground. The accelerometer 1230 may generate an output signal that when processed, such as in a processing element of the locator, can be used to detect that the locator is at the lowest or ground position. Alternately, or in addition, the accelerometer or other distance measurement element may be initiated or triggered by a user at the ground or other reference position.

At Stages 2 through 4, the locator may be raised by the operator to successive heights above the ground $H_1$, $H_2$, and $H_3$ as shown, with measurements taken at corresponding positions $P_1$, $P_2$, and $P_3$. $P_1$ may also be at the ground point or a known offset from the ground (e.g., the sensor ball radius) rather than at a first raised point as shown. The distances between positions $P_1$, $P_2$, and $P_3$ and the ground surface may be determined by double-integrating the accelerometer output (in the vertical direction or Z-axis). Additional measurements and associated distances may be taken at other positions and stages (not shown), such as at higher distances above the ground and/or at positions intermediate to those previously taken. The measurement triggering may be done by a user in some embodiments and/or may be done automatically by the locator based on sensed distances from the accelerometer outputs and/or based on predefined time intervals or other measurement parameters.

Figure 13:
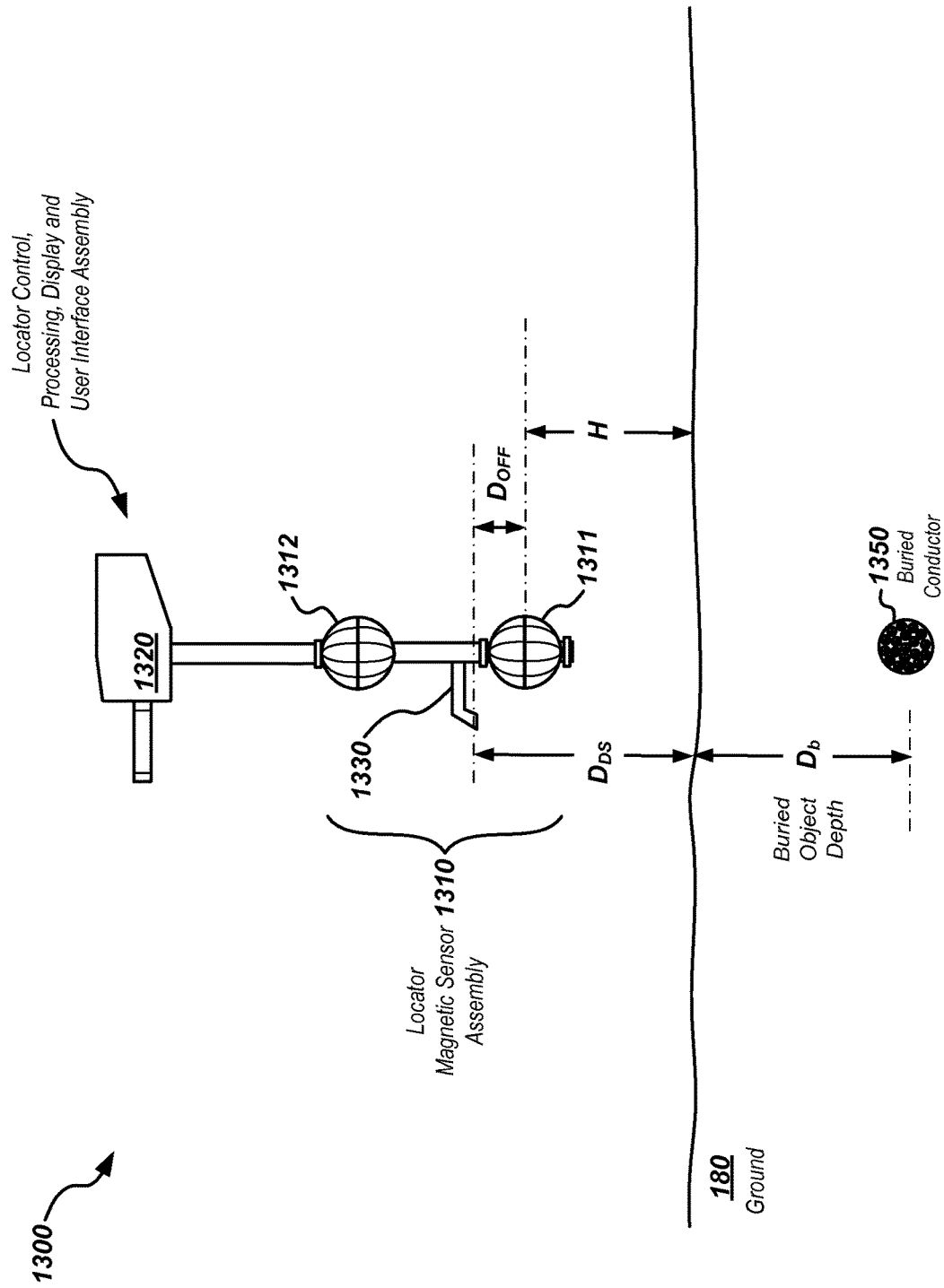
FIG. 13 illustrates details of an alternate locator embodiment including a distance sensor element to determine a distance between a locator reference point and ground.

FIG. 13 illustrates another locator embodiment using a distance sensor element, 1330, which may be part of a distance sensing module for determining the distance from a reference point on the locator to the ground or other surface in a locator 1300 having two magnetic field sensors 1311 and 1312 (other locator configurations, such as locators with one sensor or three sensors, can be similarly configured with a distance measuring element). Distance sensor element 1330 may be, for example, an infra-red distance sensor, acoustic distance sensor, imaging distance sensor, electro-mechanical distance sensor, or other distance sensor device as known or developed in the art to determine a distance, $D_{DS}$, to the ground 180 surface. The distance sensor measurements can be used in processing as described previously herein, such as in locator control, processing, and display module 1320, to determine buried object 1350 depth, $D_b$, by providing distance information associated with magnetic field measurements taken by the locator. For example, the distance sensor 1330 will be at a known distance offset, $D_{OFF}$, from a sensor element 1311, and the corresponding height of the sensor element 1311 above the ground, H, can be determined by subtracting $D_{OFF}$ from $D_{DS}$. Processing can be performed using a sheet current flow model, such as the three measurement or four measurement sheet current model solutions described previously herein, to determine an estimate of buried object depth $D_b$.

Figure 14:
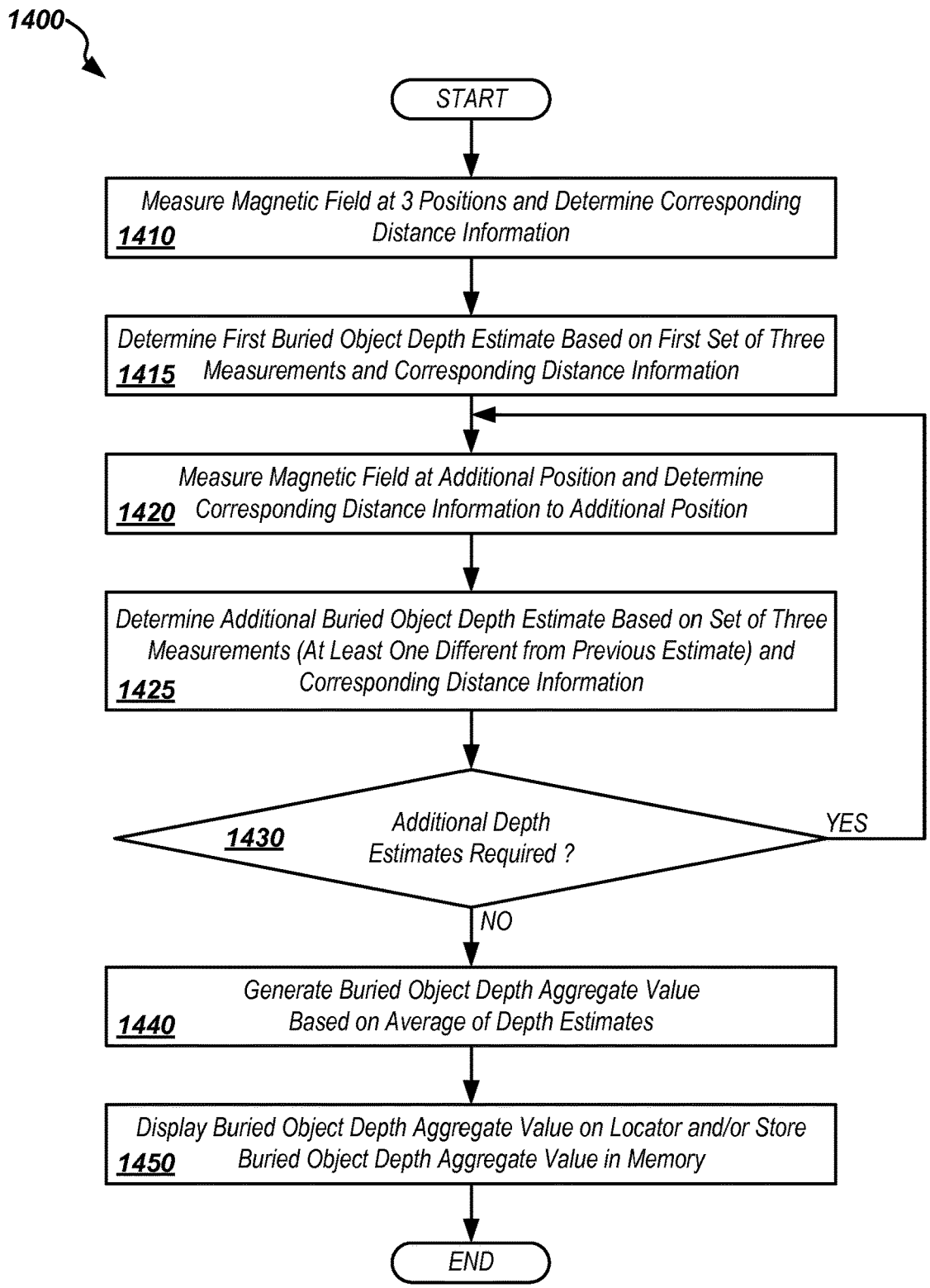
FIG. 14 illustrates details of an embodiment of a process for determining an estimated depth to a buried object using locators such as shown in FIG. 13 and FIG. 14???

FIG. 14 illustrates details of an embodiment 1400 of a process for determining a depth estimate of a buried object below a ground surface. Process 1400 may be implemented on a locator device such as locator embodiment 1300 of FIG. 13 or locator embodiment 1400 of FIG. 14. Process 1400 may be implemented in a locator circuit configuration such as shown in locator embodiment 900 of FIG. 9.

Process 1400 may begin at stage 1410, where magnetic field measurements may be taken at an initial three positions. In addition, a measurement of distance from a reference point on the locator to the ground surface may be taken at each magnetic field measurement position and associated with the magnetic field measurements. This combination of magnetic field measurements and associated distance measurements may then be used to generate a first depth estimate at stage 1415 using a sheet current flow model as described previously herein, which may then be stored in memory.

The magnetic field measurement and distance measurement process may then be repeated to generate additional depth estimates, where each additional depth estimate may be based on at least one different magnetic field and distance measurement (as compared to the other depth estimates). For example, at stage 1420, another magnetic field and distance measurement may be taken at another position and stored in memory. Based on this additional measurement set, another depth estimate may be determined. For example, if the measurements taken at stage 1415 consist of measurement sets M1, M2, and M3 (where Mn corresponds with a magnetic field and distance pair taken at position n), a new measurement pair, M4, may be taken at position 4 and a depth estimate may be determined based on measurement pairs M2, M3, and M4. Other permutations of measurement pairs may also be used in some embodiments. For example, a second depth estimate may be based on M4, M5, and M6, where additional measurements are taken at subsequent positions 5 and 6. At stage 1425, the additional depth estimate may be generated, such as by using the sheet current flow models described previously herein, and stored in memory.

To improve the overall depth estimate, these first, second, and/or additional depth measurements may be averaged, either equally or based on a weighted average, to generate an aggregate depth estimate. The number of depth estimates used to generate the aggregate may be determined at decision stage 1430, where a decision may be made as to whether a desired number of estimates for use in the aggregate have been collected. If they have not, processing may return to stage 1420, where additional measurements and depth estimates may be made. Alternately, if a desired number of depth estimates have been determined, (e.g., 2, 3, or more) processing may proceed to stage 1440 where the aggregate depth estimate may be determined by averaging the previously determined plurality of depth estimates. At stage 1450, the aggregate/averaged depth estimate may be displayed on a display element of the locator and/or stored in a memory of the locator, and/or sent to an external computing system for further display, review, storage, and/or processing.

In some configurations, the apparatus or systems described herein may include means for implementing features or providing functions related to buried object depth estimation as described herein. In one aspect, the aforementioned means may be a module including a processor or processors, associated memory and/or other electronics in which embodiments of the disclosure reside, such as to implement buried object depth location functions as described herein. These may be, for example, modules or apparatus residing in buried locators or other systems such as computer systems, mobile phones, server systems, or other electronic or computing systems.

In one or more exemplary embodiments, the electronic functions, methods and processes described herein and associated with buried object detection functions may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable media except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented in one or more processing elements comprising electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to locator systems may be implemented or performed in a processing element including a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the following claims and their equivalents.

I claim:

1. A locator system for determining the location of a buried utility, comprising:
   a transmitter for generating a current signal for coupling to a buried utility;
   a coupling apparatus for coupling the current signal to the buried utility by either direct or inductive coupling;
   a locator comprising a magnetic field sensor assembly including:
   A plurality of magnetic field sensors configured to generate lower and upper magnetic field measurement information at first and a second locator positions based on magnetic field signals emitted from the buried utility in response to the current signal flowing therein;

a memory module; and a processor module operatively coupled to the memory module, wherein the processor is programmed to execute instructions stored in the memory module to:

process the first and second position lower and upper magnetic field measurements in accordance with a closed-form sheet current flow model to generate an estimate of the depth, $D_b$, of the buried object below a ground surface;

store the estimated depth in the memory module; and provide a visual display of the estimated depth and position of the buried utility on the locator.

2. The locator of claim 1, wherein the estimated depth, $D_b$, is determined in the processor module using a closed-form sheet current flow model of the form:

$$D_b = \frac{L+M}{N} - H_1$$

where:

$$L = (B_{1b} - B_{1T}) * (B_{1T} - B_{2T}) * (B_{1b} + B_{1T} - B_{2b} - B_{2T}) * sep$$

$$M = \sqrt{\frac{(B_{1b} - B_{1T})*(B_{1b} - B_{2b})*(B_{1T} - B_{2T})*(B_{1b} + B_{1T} - B_{2b} - B_{2T})^2 *}{(B_{2b} - B_{2T})*sep^2)}}$$

$$N = (B_{1b} - B_{1T})*(B_{1b} + B_{1T} - B_{2b} - B_{2T})*(B_{1b} - B_{1T} - B_{2b} + B_{2T}).$$

3. The system of claim 1, wherein the plurality of magnetic field sensors includes a first, second, and third sensor.

4. The system of claim 3, wherein the first, second, and third sensors are positioned approximately linearly on a line intersecting the buried utility.

5. The system of claim 4, wherein the line is along a vertical centerline extending upward from the buried object and ground surface.

6. The system of claim 4, wherein the line is offset at an angle of approximately ten degrees or less from a vertical centerline extending upward from the buried object and ground surface.

7. The system of claim 3, wherein the first, second, and third sensors are co-linear on a line translated horizontally from a vertical centerline extending upward from the buried object and ground surface.

8. The system of claim 3, wherein the measurements at the first, second, and third sensors are generated approximately simultaneously by the first, second, and third magnetic field antenna sensors.

9. The system of claim 1, wherein the sheet current flow model includes a magnetic field component modeled as being generated by a finite sheet current.

10. The system of claim 1, wherein the sheet current flow model includes a model of a sheet current flowing in a ground material in proximity to a ground surface and a model of a conductor current flowing in a conductor disposed at a distance below the ground surface.

11. The system of claim 1, wherein the sheet current flow model is represented by an open-form equation solution rather than a closed-form solution, the method further comprising iteratively solving the open-form equation in the locator.

12. The method of claim 1, wherein the processing element is further programmed to automatically determining an optimal measurement position above the ground to the buried object, and generate and process the magnetic field measurements responsive to the automatically determined an optimal measurement position.

13. The method of claim 12, wherein the automatically determining an optimal measurement position above the ground includes determining a centerline using the plurality of magnetic field sensors to provide information to position the locator over the buried object.

14. The system of claim 1, wherein the processing element is further programmed to store a specification of a buried object depth in the locator;

compare the estimated depth to the specification depth; and provide, responsive to the comparing, a notification to a user of the locator either audibly or visually.

15. The system of claim 14, wherein the notification includes providing an operator alarm if the estimated depth is less than the specification depth.

16. The system of claim 15, wherein the notification includes storing a database entry indicative of the difference between the estimated depth and the specification depth.

* * * * *